United States Patent
Leidel et al.

(10) Patent No.: US 10,540,093 B2
(45) Date of Patent: *Jan. 21, 2020

(54) MULTIDIMENSIONAL CONTIGUOUS MEMORY ALLOCATION

(71) Applicant: Micron Technology, Inc., Boise, ID (US)

(72) Inventors: John D. Leidel, McKinney, TX (US); Kevin Wadleigh, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/925,248

(22) Filed: Mar. 19, 2018

(65) Prior Publication Data
US 2018/0210660 A1  Jul. 26, 2018

Related U.S. Application Data

(63) Continuation of application No. 14/874,151, filed on Oct. 2, 2015, now Pat. No. 9,940,026.
(Continued)

(51) Int. Cl.
*G06F 12/10* (2016.01)
*G06F 3/06* (2006.01)

(52) U.S. Cl.
CPC ............ *G06F 3/0608* (2013.01); *G06F 3/064* (2013.01); *G06F 3/0605* (2013.01); *G06F 3/0623* (2013.01); *G06F 3/0688* (2013.01)

(58) Field of Classification Search
CPC ...... G06F 3/0605; G06F 3/0623; G06F 3/064; G06F 3/0688
See application file for complete search history.

(56) References Cited

U.S. PATENT DOCUMENTS

| 4,380,046 A | 4/1983 | Fung |
| 4,435,792 A | 3/1984 | Bechtolsheim |

(Continued)

FOREIGN PATENT DOCUMENTS

| CN | 102141905 | 8/2011 |
| EP | 0214718 | 3/1987 |

(Continued)

OTHER PUBLICATIONS

Boyd et al., "On the General Applicability of Instruction-Set Randomization", Jul.-Sep. 2010, (14 pgs.), vol. 7, Issue 3, IEEE Transactions on Dependable and Secure Computing.
(Continued)

*Primary Examiner* — Ryan Bertram
*Assistant Examiner* — Trang K Ta
(74) *Attorney, Agent, or Firm* — Brooks, Cameron & Huebsch, PLLC

(57) ABSTRACT

The present disclosure is related to multidimensional contiguous memory allocation. Multidimensional contiguous memory allocation can include receiving an allocation request for an amount of memory that is contiguous in a multiple dimensions of the memory and determining whether the memory includes a region corresponding to the requested amount that is a candidate as being unallocated based on information indicating a maximum number of contiguous unallocated allocable portions of the memory. In response to determining that the memory includes the candidate region, the method can include determining whether the candidate region is unallocated based on a subset of information indicating whether each allocable portion of the memory is allocated. The subset of information corresponds to the candidate region only.

18 Claims, 9 Drawing Sheets

Related U.S. Application Data

(60) Provisional application No. 62/059,488, filed on Oct. 3, 2014.

(56) References Cited

U.S. PATENT DOCUMENTS

| | | | |
|---|---|---|---|
| 4,435,793 A | 3/1984 | Ochii | |
| 4,727,474 A | 2/1988 | Batcher | |
| 4,736,439 A | 4/1988 | May | |
| 4,843,264 A | 6/1989 | Galbraith | |
| 4,958,378 A | 9/1990 | Bell | |
| 4,977,542 A | 12/1990 | Matsuda et al. | |
| 4,992,935 A * | 2/1991 | Comerford | G06F 9/5016 |
| | | | 711/170 |
| 5,023,838 A | 6/1991 | Herbert | |
| 5,034,636 A | 7/1991 | Reis et al. | |
| 5,201,039 A | 4/1993 | Sakamura | |
| 5,210,850 A | 5/1993 | Kelly et al. | |
| 5,253,308 A | 10/1993 | Johnson | |
| 5,276,643 A | 1/1994 | Hoffmann et al. | |
| 5,325,519 A | 6/1994 | Long et al. | |
| 5,367,488 A | 11/1994 | An | |
| 5,379,257 A | 1/1995 | Matsumura et al. | |
| 5,386,379 A | 1/1995 | Ali-Yahia et al. | |
| 5,398,213 A | 3/1995 | Yeon et al. | |
| 5,440,482 A | 8/1995 | Davis | |
| 5,446,690 A | 8/1995 | Tanaka et al. | |
| 5,473,576 A | 12/1995 | Matsui | |
| 5,481,500 A | 1/1996 | Reohr et al. | |
| 5,485,373 A | 1/1996 | Davis et al. | |
| 5,506,811 A | 4/1996 | McLaury | |
| 5,615,404 A | 3/1997 | Knoll et al. | |
| 5,638,128 A | 6/1997 | Hoogenboom | |
| 5,638,317 A | 6/1997 | Tran | |
| 5,654,936 A | 8/1997 | Cho | |
| 5,678,021 A | 10/1997 | Pawate et al. | |
| 5,724,291 A | 3/1998 | Matano | |
| 5,724,366 A | 3/1998 | Furutani | |
| 5,751,987 A | 5/1998 | Mahant-Shetti et al. | |
| 5,787,458 A | 7/1998 | Miwa | |
| 5,854,636 A | 12/1998 | Watanabe et al. | |
| 5,867,429 A | 2/1999 | Chen et al. | |
| 5,870,504 A | 2/1999 | Nemoto et al. | |
| 5,915,084 A | 6/1999 | Wendell | |
| 5,935,263 A | 8/1999 | Keeth et al. | |
| 5,986,942 A | 11/1999 | Sugibayashi | |
| 5,991,209 A | 11/1999 | Chow | |
| 5,991,785 A | 11/1999 | Alidina et al. | |
| 6,005,799 A | 12/1999 | Rao | |
| 6,009,020 A | 12/1999 | Nagata | |
| 6,092,186 A | 7/2000 | Betker et al. | |
| 6,122,211 A | 9/2000 | Morgan et al. | |
| 6,125,071 A | 9/2000 | Kohno et al. | |
| 6,134,164 A | 10/2000 | Lattimore et al. | |
| 6,147,514 A | 11/2000 | Shiratake | |
| 6,151,244 A | 11/2000 | Fujino et al. | |
| 6,157,578 A | 12/2000 | Brady | |
| 6,163,862 A | 12/2000 | Adams et al. | |
| 6,166,942 A | 12/2000 | Vo et al. | |
| 6,172,918 B1 | 1/2001 | Hidaka | |
| 6,175,514 B1 | 1/2001 | Henderson | |
| 6,181,698 B1 | 1/2001 | Hariguchi | |
| 6,208,544 B1 | 3/2001 | Beadle et al. | |
| 6,226,215 B1 | 5/2001 | Yoon | |
| 6,301,153 B1 | 10/2001 | Takeuchi et al. | |
| 6,301,164 B1 | 10/2001 | Manning et al. | |
| 6,304,477 B1 | 10/2001 | Naji | |
| 6,389,507 B1 | 5/2002 | Sherman | |
| 6,418,498 B1 | 7/2002 | Martwick | |
| 6,466,499 B1 | 10/2002 | Blodgett | |
| 6,480,931 B1 | 11/2002 | Buti et al. | |
| 6,510,098 B1 | 1/2003 | Taylor | |
| 6,563,754 B1 | 5/2003 | Lien et al. | |
| 6,578,058 B1 | 6/2003 | Nygaard | |
| 6,731,542 B1 | 5/2004 | Le et al. | |
| 6,754,746 B1 | 6/2004 | Leung et al. | |
| 6,768,679 B1 | 7/2004 | Le et al. | |
| 6,807,614 B2 | 10/2004 | Chung | |
| 6,816,422 B2 | 11/2004 | Hamade et al. | |
| 6,819,612 B1 | 11/2004 | Achter | |
| 6,894,549 B2 | 5/2005 | Eliason | |
| 6,943,579 B1 | 9/2005 | Hazanchuk et al. | |
| 6,948,056 B1 | 9/2005 | Roth et al. | |
| 6,950,771 B1 | 9/2005 | Fan et al. | |
| 6,950,898 B2 | 9/2005 | Merritt et al. | |
| 6,956,770 B2 | 10/2005 | Khalid et al. | |
| 6,961,272 B2 | 11/2005 | Schreck | |
| 6,965,648 B1 | 11/2005 | Smith et al. | |
| 6,985,394 B2 | 1/2006 | Kim | |
| 6,987,693 B2 | 1/2006 | Cernea et al. | |
| 7,020,017 B2 | 3/2006 | Chen et al. | |
| 7,028,170 B2 | 4/2006 | Saulsbury | |
| 7,045,834 B2 | 5/2006 | Tran et al. | |
| 7,054,178 B1 | 5/2006 | Shiah et al. | |
| 7,061,817 B2 | 6/2006 | Raad et al. | |
| 7,079,407 B1 | 7/2006 | Dimitrelis | |
| 7,173,857 B2 | 2/2007 | Kato et al. | |
| 7,187,585 B2 | 3/2007 | Li et al. | |
| 7,196,928 B2 | 3/2007 | Chen | |
| 7,260,565 B2 | 8/2007 | Lee et al. | |
| 7,260,672 B2 | 8/2007 | Garney | |
| 7,372,715 B2 | 5/2008 | Han | |
| 7,400,532 B2 | 7/2008 | Aritome | |
| 7,406,494 B2 | 7/2008 | Magee | |
| 7,447,720 B2 | 11/2008 | Beaumont | |
| 7,454,451 B2 | 11/2008 | Beaumont | |
| 7,457,181 B2 | 11/2008 | Lee et al. | |
| 7,535,769 B2 | 5/2009 | Cernea | |
| 7,546,438 B2 | 6/2009 | Chung | |
| 7,562,198 B2 | 7/2009 | Noda et al. | |
| 7,574,466 B2 | 8/2009 | Beaumont | |
| 7,602,647 B2 | 10/2009 | Li et al. | |
| 7,663,928 B2 | 2/2010 | Tsai et al. | |
| 7,676,627 B2 | 3/2010 | Wong et al. | |
| 7,685,365 B2 | 3/2010 | Rajwar et al. | |
| 7,692,466 B2 | 4/2010 | Ahmadi | |
| 7,752,417 B2 | 7/2010 | Manczak et al. | |
| 7,791,962 B2 | 9/2010 | Noda et al. | |
| 7,796,453 B2 | 9/2010 | Riho et al. | |
| 7,805,587 B1 | 9/2010 | Van Dyke et al. | |
| 7,808,854 B2 | 10/2010 | Takase | |
| 7,827,372 B2 | 11/2010 | Bink et al. | |
| 7,869,273 B2 | 1/2011 | Lee et al. | |
| 7,898,864 B2 | 3/2011 | Dong | |
| 7,924,628 B2 | 4/2011 | Danon et al. | |
| 7,937,535 B2 | 5/2011 | Ozer et al. | |
| 7,957,206 B2 | 6/2011 | Bauser | |
| 7,979,667 B2 | 7/2011 | Allen et al. | |
| 7,996,749 B2 | 8/2011 | Ding et al. | |
| 8,042,082 B2 | 10/2011 | Solomon | |
| 8,045,391 B2 | 10/2011 | Mohklesi | |
| 8,059,438 B2 | 11/2011 | Chang et al. | |
| 8,095,825 B2 | 1/2012 | Hirotsu et al. | |
| 8,117,462 B2 | 2/2012 | Snapp et al. | |
| 8,164,942 B2 | 4/2012 | Gebara et al. | |
| 8,208,328 B2 | 6/2012 | Hong | |
| 8,213,248 B2 | 7/2012 | Moon et al. | |
| 8,223,568 B2 | 7/2012 | Seo | |
| 8,238,173 B2 | 8/2012 | Akerib et al. | |
| 8,274,841 B2 | 9/2012 | Shimano et al. | |
| 8,279,683 B2 | 10/2012 | Klein | |
| 8,310,884 B2 | 11/2012 | Iwai et al. | |
| 8,332,367 B2 | 12/2012 | Bhattacherjee et al. | |
| 8,339,824 B2 | 12/2012 | Cooke | |
| 8,339,883 B2 | 12/2012 | Yu et al. | |
| 8,347,154 B2 | 1/2013 | Bahali et al. | |
| 8,351,292 B2 | 1/2013 | Matano | |
| 8,356,144 B2 | 1/2013 | Hessel et al. | |
| 8,417,921 B2 | 4/2013 | Gonion et al. | |
| 8,462,532 B1 | 6/2013 | Argyres | |
| 8,484,276 B2 | 7/2013 | Carlson et al. | |
| 8,495,438 B2 | 7/2013 | Roine | |
| 8,503,250 B2 | 8/2013 | Demone | |
| 8,526,239 B2 | 9/2013 | Kim | |

(56) References Cited

U.S. PATENT DOCUMENTS

| | | |
|---|---|---|
| 8,533,245 B1 | 9/2013 | Cheung |
| 8,555,037 B2 | 10/2013 | Gonion |
| 8,599,613 B2 | 12/2013 | Abiko et al. |
| 8,605,015 B2 | 12/2013 | Guttag et al. |
| 8,625,376 B2 | 1/2014 | Jung et al. |
| 8,644,101 B2 | 2/2014 | Jun et al. |
| 8,650,232 B2 | 2/2014 | Stortz et al. |
| 8,873,272 B2 | 10/2014 | Lee |
| 8,964,496 B2 | 2/2015 | Manning |
| 8,971,124 B1 | 3/2015 | Manning |
| 8,996,844 B1 | 3/2015 | Zhu et al. |
| 9,015,390 B2 | 4/2015 | Klein |
| 9,047,193 B2 | 6/2015 | Lin et al. |
| 9,165,023 B2 | 10/2015 | Moskovich et al. |
| 2001/0007112 A1 | 7/2001 | Porterfield |
| 2001/0008492 A1 | 7/2001 | Higashiho |
| 2001/0010057 A1 | 7/2001 | Yamada |
| 2001/0028584 A1 | 10/2001 | Nakayama et al. |
| 2001/0043089 A1 | 11/2001 | Forbes et al. |
| 2002/0059355 A1 | 5/2002 | Peleg et al. |
| 2003/0023815 A1 | 1/2003 | Yoneyama et al. |
| 2003/0167426 A1 | 9/2003 | Slobodnik |
| 2003/0222879 A1 | 12/2003 | Lin et al. |
| 2004/0073592 A1 | 4/2004 | Kim et al. |
| 2004/0073773 A1 | 4/2004 | Demjanenko |
| 2004/0085840 A1 | 5/2004 | Vali et al. |
| 2004/0095826 A1 | 5/2004 | Perner |
| 2004/0154002 A1 | 8/2004 | Ball et al. |
| 2004/0205289 A1 | 10/2004 | Srinivasan |
| 2004/0240251 A1 | 12/2004 | Nozawa et al. |
| 2005/0015557 A1 | 1/2005 | Wang et al. |
| 2005/0078514 A1 | 4/2005 | Scheuerlein et al. |
| 2005/0097417 A1 | 5/2005 | Agrawal et al. |
| 2006/0047937 A1 | 3/2006 | Selvaggi et al. |
| 2006/0069849 A1 | 3/2006 | Rudelic |
| 2006/0146623 A1 | 7/2006 | Mizuno et al. |
| 2006/0149804 A1 | 7/2006 | Luick et al. |
| 2006/0181917 A1 | 8/2006 | Kang et al. |
| 2006/0215432 A1 | 9/2006 | Wickeraad et al. |
| 2006/0225072 A1 | 10/2006 | Lari et al. |
| 2006/0291282 A1 | 12/2006 | Liu et al. |
| 2007/0103986 A1 | 5/2007 | Chen |
| 2007/0171747 A1 | 7/2007 | Hunter et al. |
| 2007/0180006 A1 | 8/2007 | Gyoten et al. |
| 2007/0180184 A1 | 8/2007 | Sakashita et al. |
| 2007/0195602 A1 | 8/2007 | Fong et al. |
| 2007/0285131 A1 | 12/2007 | Sohn |
| 2007/0285979 A1 | 12/2007 | Turner |
| 2007/0291532 A1 | 12/2007 | Tsuji |
| 2007/0294179 A1 | 12/2007 | Krawetz |
| 2008/0025073 A1 | 1/2008 | Arsovski |
| 2008/0037333 A1 | 2/2008 | Kim et al. |
| 2008/0052711 A1 | 2/2008 | Forin et al. |
| 2008/0137388 A1 | 6/2008 | Krishnan et al. |
| 2008/0165601 A1 | 7/2008 | Matick et al. |
| 2008/0178053 A1 | 7/2008 | Gorman et al. |
| 2008/0215937 A1 | 9/2008 | Dreibelbis et al. |
| 2009/0067218 A1 | 3/2009 | Graber |
| 2009/0154238 A1 | 6/2009 | Lee |
| 2009/0154273 A1 | 6/2009 | Borot et al. |
| 2009/0254697 A1 | 10/2009 | Akerib |
| 2010/0064113 A1 | 3/2010 | Lindahl et al. |
| 2010/0067296 A1 | 3/2010 | Li |
| 2010/0091582 A1 | 4/2010 | Vali et al. |
| 2010/0172190 A1 | 7/2010 | Lavi et al. |
| 2010/0210076 A1 | 8/2010 | Gruber et al. |
| 2010/0226183 A1 | 9/2010 | Kim |
| 2010/0308858 A1 | 12/2010 | Noda et al. |
| 2010/0332895 A1 | 12/2010 | Billing et al. |
| 2011/0051523 A1 | 3/2011 | Manabe et al. |
| 2011/0063919 A1 | 3/2011 | Chandrasekhar et al. |
| 2011/0093662 A1 | 4/2011 | Walker et al. |
| 2011/0103151 A1 | 5/2011 | Kim et al. |
| 2011/0119467 A1 | 5/2011 | Cadambi et al. |
| 2011/0122695 A1 | 5/2011 | Li et al. |
| 2011/0140741 A1 | 6/2011 | Zerbe et al. |
| 2011/0219260 A1 | 9/2011 | Nobunaga et al. |
| 2011/0267883 A1 | 11/2011 | Lee et al. |
| 2011/0317496 A1 | 12/2011 | Bunce et al. |
| 2012/0005397 A1 | 1/2012 | Lim et al. |
| 2012/0017039 A1 | 1/2012 | Margetts |
| 2012/0023281 A1 | 1/2012 | Kawasaki et al. |
| 2012/0106287 A1 | 5/2012 | Catovic et al. |
| 2012/0120705 A1 | 5/2012 | Mitsubori et al. |
| 2012/0134216 A1 | 5/2012 | Singh |
| 2012/0134225 A1 | 5/2012 | Chow |
| 2012/0134226 A1 | 5/2012 | Chow |
| 2012/0140540 A1 | 6/2012 | Agam et al. |
| 2012/0182798 A1 | 7/2012 | Hosono et al. |
| 2012/0195146 A1 | 8/2012 | Jun et al. |
| 2012/0198310 A1 | 8/2012 | Tran et al. |
| 2012/0246380 A1 | 9/2012 | Akerib et al. |
| 2012/0265964 A1 | 10/2012 | Murata et al. |
| 2012/0281486 A1 | 11/2012 | Rao et al. |
| 2012/0303627 A1 | 11/2012 | Keeton et al. |
| 2013/0003467 A1 | 1/2013 | Klein |
| 2013/0061006 A1 | 3/2013 | Hein |
| 2013/0107623 A1 | 5/2013 | Kavalipurapu et al. |
| 2013/0117541 A1 | 5/2013 | Choquette et al. |
| 2013/0124783 A1 | 5/2013 | Yoon et al. |
| 2013/0132702 A1 | 5/2013 | Patel et al. |
| 2013/0138646 A1 | 5/2013 | Sirer et al. |
| 2013/0163362 A1 | 6/2013 | Kim |
| 2013/0173888 A1 | 7/2013 | Hansen et al. |
| 2013/0205114 A1 | 8/2013 | Badam et al. |
| 2013/0219112 A1 | 8/2013 | Okin et al. |
| 2013/0227361 A1 | 8/2013 | Bowers et al. |
| 2013/0283122 A1 | 10/2013 | Anholt et al. |
| 2013/0286705 A1 | 10/2013 | Grover et al. |
| 2013/0326154 A1 | 12/2013 | Haswell |
| 2013/0332707 A1 | 12/2013 | Gueron et al. |
| 2014/0185395 A1 | 7/2014 | Seo |
| 2014/0215185 A1 | 7/2014 | Danielsen |
| 2014/0250279 A1 | 9/2014 | Manning |
| 2014/0281340 A1* | 9/2014 | Confer .................. G06F 12/023 711/171 |
| 2014/0281366 A1* | 9/2014 | Felch .................. G06F 12/0886 711/207 |
| 2014/0285662 A1 | 9/2014 | Murashita |
| 2014/0344934 A1 | 11/2014 | Jorgensen |
| 2015/0029798 A1 | 1/2015 | Manning |
| 2015/0042380 A1 | 2/2015 | Manning |
| 2015/0063052 A1 | 3/2015 | Manning |
| 2015/0078108 A1 | 3/2015 | Cowles et al. |
| 2015/0120987 A1 | 4/2015 | Wheeler |
| 2015/0134713 A1 | 5/2015 | Wheeler |
| 2015/0143037 A1 | 5/2015 | Smith |
| 2015/0193431 A1 | 7/2015 | Stoytchev et al. |
| 2015/0270015 A1 | 9/2015 | Murphy et al. |
| 2015/0279466 A1 | 10/2015 | Manning |
| 2015/0324290 A1 | 11/2015 | Leidel |
| 2015/0325272 A1 | 11/2015 | Murphy |
| 2015/0356009 A1 | 12/2015 | Wheeler et al. |
| 2015/0356022 A1 | 12/2015 | Leidel et al. |
| 2015/0357007 A1 | 12/2015 | Manning et al. |
| 2015/0357008 A1 | 12/2015 | Manning et al. |
| 2015/0357019 A1 | 12/2015 | Wheeler et al. |
| 2015/0357020 A1 | 12/2015 | Manning |
| 2015/0357021 A1 | 12/2015 | Hush |
| 2015/0357022 A1 | 12/2015 | Hush |
| 2015/0357023 A1 | 12/2015 | Hush |
| 2015/0357024 A1 | 12/2015 | Hush et al. |
| 2015/0357047 A1 | 12/2015 | Tiwari |

FOREIGN PATENT DOCUMENTS

| | | |
|---|---|---|
| EP | 2026209 | 2/2009 |
| JP | H0831168 | 2/1996 |
| JP | 2009259193 | 3/2015 |
| KR | 10-0211482 | 8/1998 |
| KR | 10-2010-0134235 | 12/2010 |
| KR | 10-2013-0049421 | 5/2013 |
| WO | 2001065359 | 9/2001 |
| WO | 2010079451 | 7/2010 |

(56) References Cited

FOREIGN PATENT DOCUMENTS

| WO | 2013062596 | 5/2013 |
| WO | 2013081588 | 6/2013 |
| WO | 2013095592 | 6/2013 |

OTHER PUBLICATIONS

Stojmenovic, "Multiplicative Circulant Networks Topological Properties and Communication Algorithms", (25 pgs.), Discrete Applied Mathematics 77 (1997) 281-305.
"4.9.3 Minloc and Maxloc", Jun. 12, 1995, (5pgs.), Message Passing Interface Forum 1.1, retrieved from http://www.mpi-forum.org/docs/mpi-1.1/mpi-11-html/node79.html.
Derby, et al., "A High-Performance Embedded DSP Core with Novel SIMD Features", Apr. 6-10, 2003, (4 pgs), vol. 2, pp. 301-304, 2003 IEEE International Conference on Accoustics, Speech, and Signal Processing.
Debnath, Biplob, Bloomflash: Bloom Filter on Flash-Based Storage, 2011 31st Annual Conference on Distributed Computing Systems, Jun. 20-24, 2011, 10 pgs.
Pagiamtzis, Kostas, "Content-Addressable Memory Introduction", Jun. 25, 2007, (6 pgs.), retrieved from: http://www.pagiamtzis.com/cam/camintro.
Pagiamtzis, et al., "Content-Addressable Memory (CAM) Circuits and Architectures: A Tutorial and Survey", Mar. 2006, (16 pgs.), vol. 41, No. 3, IEEE Journal of Solid-State Circuits.
International Search Report and Written Opinion for PCT Application No. PCT/US2013/043702, dated Sep. 26, 2013, (11 pgs.).
Elliot, et al., "Computational RAM: Implementing Processors in Memory", Jan.-Mar. 1999, (10 pgs.), vol. 16, Issue 1, IEEE Design and Test of Computers Magazine.
Dybdahl, et al., "Destructive-Read in Embedded DRAM, Impact on Power Consumption," Apr. 2006, (10 pgs.), vol. 2, Issue 2, Journal of Embedded Computing-Issues in embedded single-chip multicore architectures.
Kogge, et al., "Processing in Memory: Chips to Petaflops," May 23, 1997, (8 pgs.), retrieved from: http://www.cs.ucf.edu/courses/cda5106/summer02/papers/kogge97PIM.pdf.
Draper, et al., "The Architecture of the DIVA Processing-In-Memory Chip," Jun. 22-26, 2002, (12 pgs.), ICS '02, retrieved from: http://www.isi.edu/~draper/papers/ics02.pdf.
Adibi, et al., "Processing-In-Memory Technology for Knowledge Discovery Algorithms," Jun. 25, 2006, (10 pgs.), Proceeding of the Second International Workshop on Data Management on New Hardware, retrieved from: http://www.cs.cmu.edu/~damon2006/pdf/adibi06inmemory.pdf.
U.S. Appl. No. 13/449,082, entitled, "Methods and Apparatus for Pattern Matching," filed Apr. 17, 2012, (37 pgs.).
U.S. Appl. No. 13/743,686, entitled, "Weighted Search and Compare in a Memory Device," filed Jan. 17, 2013, (25 pgs.).
U.S. Appl. No. 13/774,636, entitled, "Memory As a Programmable Logic Device," filed Feb. 22, 2013, (30 pgs.).
U.S. Appl. No. 13/774,553, entitled, "Neural Network in a Memory Device," filed Feb. 22, 2013, (63 pgs.).
U.S. Appl. No. 13/796,189, entitled, "Performing Complex Arithmetic Functions in a Memory Device," filed Mar. 12, 2013, (23 pgs.).

\* cited by examiner

MULTIDIMENSIONAL CONTIGUOUS MEMORY ALLOCATION

PRIORITY INFORMATION

This application is a Continuation of U.S. application Ser. No. 14/874,151, filed Oct. 2, 2015, which claims the benefit of U.S. Provisional Patent Application No. 62/059,488 filed on Oct. 3, 2014, the contents of which are incorporated herein by reference.

TECHNICAL FIELD

The present disclosure relates generally to semiconductor memory and methods, and more particularly, to multidimensional contiguous virtual memory allocation.

BACKGROUND

Memory devices are typically provided as internal, semiconductor, integrated circuits in computing systems or other electronic devices. There are many different types of memory including volatile and non-volatile memory. Volatile memory can require power to maintain its data (e.g., user data, error data, etc.) and includes random-access memory (RAM), dynamic random access memory (DRAM), and synchronous dynamic random access memory (SDRAM), among others. Non-volatile memory can provide persistent data by retaining stored data when not powered and can include non-volatile random access memory (NVRAM), NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAIVI), such as spin torque transfer random access memory (STT RAM), among others.

Computing systems often include a number of processing resources (e.g., one or more processors), which may retrieve and execute instructions and store the results of the executed instructions to a suitable location. A processing resource can comprise a number of functional units (e.g., herein referred to as functional unit circuitry (FUC)) such as arithmetic logic unit (ALU) circuitry, floating point unit (FPU) circuitry, and/or a combinatorial logic block, for example, which can execute instructions to perform logical operations such as AND, OR, NOT, NAND, NOR, and XOR logical operations on data (e.g., one or more operands).

A number of components in a computing system may be involved in providing instructions to the functional unit circuitry for execution. The instructions may be generated, for instance, by a processing resource such as a controller and/or host processing resource. Data (e.g., the operands on which the instructions will be executed to perform the logical operations) may be stored in a memory array that is accessible by the FUC. The instructions and/or data may be retrieved from the memory array and sequenced and/or buffered before the FUC begins to execute instructions on the data. Furthermore, as different types of operations may be executed in one or multiple clock cycles through the FUC, intermediate results of the operations and/or data may also be sequenced and/or buffered. In many instances, the processing resources (e.g., processor and/or associated FUC) may be external to the memory array, and data can be accessed (e.g., via a bus between the processing resources and the memory array to execute instructions). Data can be moved from the memory array to registers external to the memory array via a bus.

Virtual memory is a memory mapping technique that is implemented using both hardware and software. It maps memory addresses used by a program, called virtual addresses, into physical addresses in physical memory. The memory space, as seen by a process or task, appears as contiguous address space or a collection of contiguous segments. An operating system manages virtual address spaces and the assignment of physical memory to virtual memory. Software within the operating system may extent these capabilities to provide a virtual address space that can exceed the capacity of real memory and thus reference more than is physically present. Some benefits of virtual memory include freeing applications from having to manage a shared memory space, increased security due to memory isolation, and being able to conceptually use more memory than might be physically available.

DETAILED DESCRIPTION

Figure 1:
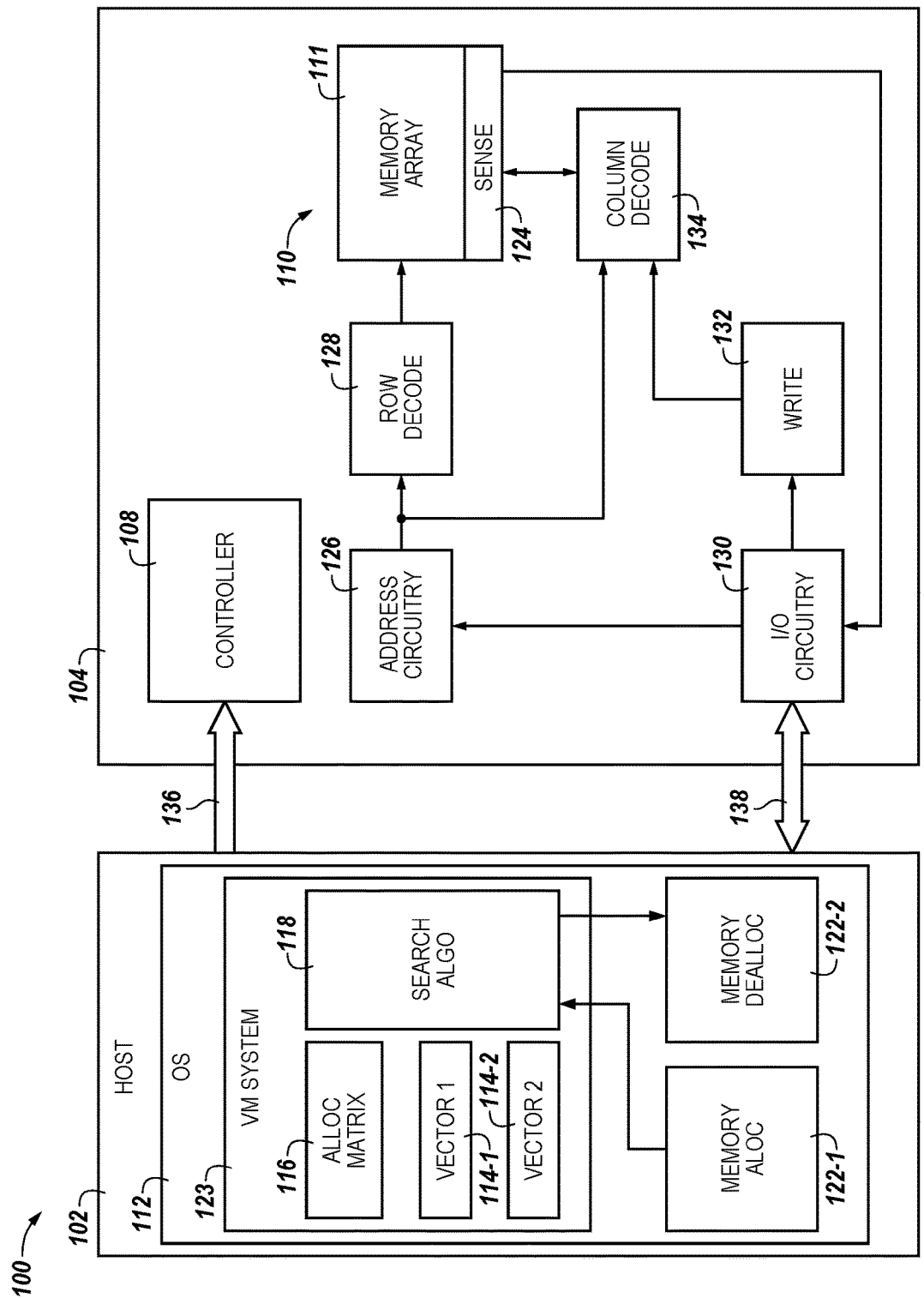
FIG. 1 is a block diagram of an apparatus in the form of a computing system including at least one memory system in accordance with a number of embodiments of the present disclosure.

In some approaches to managing virtual memory, the virtual address space may appear to address physical memory as a collection of contiguous segments (e.g., one segment for each allocation of memory) that is one-dimensional, even if the physical memory is organized as a series of hierarchical multidimensional units. As such, virtual allocations can be fulfilled in virtually contiguous, physically disjoint strips of one-dimensional space. The physical memory may become fragmented, which inefficiently utilizes the memory and does not facilitate effective use of contiguous regions of the memory, particularly in more than one dimension of the memory. The more the physical memory becomes fragmented, the more difficult it may be to allocate larger contiguous portions of the memory. However, it may not be advantageous to have a direct correlation between the virtual address space and the physical address space. This can allow the operating system to work with different types of memory, different sizes of memory, and different memory protocols without having to significantly (or at all) change the way the virtual address space operates. For example, this can allow an application that is using virtual memory space to be assigned different physical memory space without having to change the virtual memory space assigned to the application (e.g., the application can be physically "relocated" without the knowledge of and/or action from the application).

Recent advances in memory technology, for example, related to processing in memory, which can benefit from multidimensional bit contiguity, may make it advantageous to allocate physically bit contiguous blocks of virtual memory. However, the notions of multidimensional physical bit contiguity do not fit current models of one-dimensional virtual allocation. Multidimensional bit contiguity is described in more detail with respect to FIGS. 8-9. Expanding the current use of one-dimensional memory allocation may increase the amount of memory (e.g., large data constructs) that are scanned for candidate unallocated memory in more than one dimension of the physical memory space. Given the statistical potential for significant fragmentation, especially in dense memory devices, an NP search complexity problem can arise that is not useful for applications.

The present disclosure is related to multidimensional contiguous memory allocation. Multidimensional contiguous memory allocation can include receiving an allocation request for an amount of memory that is contiguous in multiple dimensions of the memory and determining whether the memory includes a region corresponding to the requested amount that is a candidate as being unallocated based on information indicating a maximum number of contiguous unallocated allocable portions of the memory. In response to determining that the memory includes the candidate region, the method can include determining whether the candidate region is unallocated based on a subset of information indicating whether each allocable portion of the memory is allocated. The subset of information corresponds to the candidate region only.

A number of embodiments of the present disclosure can provide the ability to explicitly allocate virtual memory in well-defined, contiguous multidimensional bit patterns without traversing all possible bits of the target physical memory to determine where space is available. Some embodiments can reduce the search space for a given allocation to be significantly less than the total number of bits in the target memory. A number of embodiments can reduce relative memory fragmentation in multiple dimensions across multiple devices when allocating virtual memory of different shapes and complexity.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designators "A", "B", "C", "M", "N", "S", and "X", particularly with respect to reference numerals in the drawings, indicates that a number of the particular feature so designated can be included. As used herein, "a number of" a particular thing can refer to one or more of such things (e.g., a number of memory devices can refer to one or more memory devices). As used herein, the terms "first" and "second" are used to differentiate between one feature from another and do not necessarily imply an order between the features so designated.

The figures herein follow a numbering convention in which the first digit or digits correspond to the drawing figure number and the remaining digits identify an element or component in the drawing. Similar elements or components between different figures may be identified by the use of similar digits. For example, 662 may reference element "62" in FIG. 6, and a similar element may be referenced as 762 in FIG. 7. Multiple analogous elements within one figure may be referenced with a reference numeral followed by a hyphen and another numeral or a letter. For example, 440-1 may reference element 40-1 in FIGS. 4 and 440-X may reference element 40-X, which can be analogous to element 440-1. Such analogous elements may be generally referenced without the hyphen and extra numeral or letter. For example, elements 440-1, . . . , 440-X may be generally referenced as 440. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 is a block diagram of an apparatus in the form of a computing system 100 including at least one memory system 104 in accordance with a number of embodiments of the present disclosure. As used herein, a host 102, a memory system 104, a memory device 110, a memory array 111, and/or sensing circuitry 124 might also be separately considered an "apparatus."

The computing system 100 can include a host 102 coupled to memory system 104, which includes a memory device 110 (e.g., including a memory array 111 and/or sensing circuitry 124). The host 102 can be a host system such as a personal laptop computer, a desktop computer, a digital camera, a mobile telephone, or a memory card reader, among various other types of hosts. In some embodiments, the host 102 can be or include a memory management unit. A memory management unit is a hardware component that performs translation between virtual memory addresses and physical memory addresses. The host 102 can store and/or access a multidimensional matrix 116 (e.g., "ALLOC MATRIX") and a number of vectors 114 such as "VECTOR 1" 114-1 and "VECTOR 2" 114-2. The host 102 can include a system motherboard and/or backplane and can include a number of processing resources (e.g., one or more processors, microprocessors, or some other type of controlling circuitry). The computing system 100 can include separate integrated circuits or both the host 102 and the memory system 104 can be on the same integrated circuit. The computing system 100 can be, for instance, a server system and/or a high performance computing system and/or a portion thereof. Although the example shown in FIG. 1 illustrates a system having a Von Neumann architecture, embodiments of the present disclosure can be implemented in non-Von Neumann architectures (e.g., a Turing machine), which may not include one or more components (e.g., CPU, ALU, etc.) often associated with a Von Neumann architecture.

For clarity, the computing system 100 has been simplified to focus on features with particular relevance to the present disclosure. The memory array 111 can be a hybrid memory cube (HMC), processing in memory random access memory (PIMRAM) array, DRAM array, SRAM array, STT RAM array, PCRAM array, TRAM array, RRAM array, NVRAM array, NAND flash array, and/or NOR flash array, for instance. The memory array 111 can comprise memory cells arranged in rows coupled by access lines (which may be referred to herein as word lines or select lines) and columns coupled by sense lines (which may be referred to herein as digit lines or data lines). Although a single memory device 110 is shown in FIG. 1, embodiments are not so limited. For instance, memory system 104 may include a number of memory devices 110 (e.g., a number of banks of DRAM cells).

The memory device 110 can be a multidimensional random access memory. A dimension of memory is a coordinate that can be used to specify a location within the memory (e.g., the location of a memory cell or allocable portion of memory). Examples of dimensions of a memory include rows, columns, layers (e.g., in the case of a hybrid memory cube), banks, chips, etc. A memory can have more than three dimensions in terms of coordinates. For example, a memory device 110 can include multiple memory channels (a first dimension of the memory device is a channel), each channel including multiple memory dies (a second dimension of the memory device 110 is a die), each die including multiple subarrays (a third dimension of the memory device 110 is a subarray), and each subarray including multiple rows (a fourth dimension of the memory is a row). Some embodiments are described herein with respect to a two-dimensional memory device for ease of illustration and explanation however embodiments are not so limited. One of ordinary skill in the art, having read and understood the present disclosure can apply the teachings to a memory device 110 having more than two dimensions.

The memory system 104 can include address circuitry 126 to latch address signals provided over an I/O bus 138 (e.g., a data bus) through I/O circuitry 130. Address signals can be received and decoded by a row decoder 128 and a column decoder 134 to access the memory device 110. Data can be read from the memory array 111 by sensing voltage and/or current changes on the sense lines using sensing circuitry 124. The sensing circuitry 124 can read and latch a page (e.g., row) of data from the memory array 111. The I/O circuitry 130 can be used for bi-directional data communication with host 102 over the I/O bus 138. The write circuitry 132 can be used to write data to the memory device 110.

Controller 108 can decode signals provided by control bus 136 from the host 102. These signals can include chip enable signals, write enable signals, and address latch signals that are used to control operations performed on the memory device 110, including data read, data write, and data erase operations. In various embodiments, the controller 108 is responsible for executing instructions from the host 102. The controller 108 can be a state machine, a sequencer, a processor, and/or other control circuitry.

An example of the sensing circuitry 124 is described further below in association with FIG. 3. For instance, in a number of embodiments, the sensing circuitry 124 can comprise a number of sense amplifiers and a number of compute components, which may comprise latch serving as an accumulator and can be used to perform logical operations (e.g., on data associated with complementary sense lines). Logical operations can include Boolean operations (e.g., AND, OR, NOR, XOR, etc.) as well as combinations of Boolean operations to perform other mathematical operations. In a number of embodiments, the sensing circuitry 124 can be used to perform logical operations using data stored in the memory array 111 as inputs and store the results of the logical operations back to the memory array 111 without transferring via a sense line address access (e.g., without firing a column decode signal). As such, a logical operation can be performed using sensing circuitry 124 rather than and/or in addition to being performed by processing resources external to the sensing circuitry 124 (e.g., by a processor associated with host 102 and/or other processing circuitry, such as ALU circuitry, located on the memory system 104, such as on the controller 108, or elsewhere).

In various previous approaches, data associated with a logical operation, for instance, would be read from memory via sensing circuitry and provided to an external ALU. The external ALU circuitry would perform the logical operations using the elements (which may be referred to as operands or inputs) and the result could be transferred back to the array via the local I/O lines. In contrast, in a number of embodiments of the present disclosure, sensing circuitry 124 can be configured to perform a logical operation on data stored in memory cells in memory array 111 and store the result back to the array 111 without enabling a local I/O line coupled to the sensing circuitry.

As such, in a number of embodiments, registers and/or an ALU external to the memory array 111 and sensing circuitry 124 may not be needed to perform the logical operation as the sensing circuitry 124 can be operated to perform the logical operation using the address space of memory array 111. Additionally, the logical operation can be performed without the use of an external processing resource.

The host 102 can be configured with an operating system "OS" 112. The host 102 can be coupled to the memory device 110 (e.g., via the control bus 136 and/or the I/O bus 138. The OS 112 is executable instructions (software) that manages hardware resources and provides services other executable instructions (programs) that run on the OS 112. The OS 112 can implement a virtual memory (VM) system 123. The VM system 123 can control the vectors 114 and the matrix 116. The VM system 123 can implement a search algorithm 118 to search the vectors 114 and/or scan the matrix 116. For example, the OS 112 can include instructions to search a number of vectors 114, each corresponding to a dimension of the memory device 110, instructions to scan the matrix 116 indicating whether respective allocable portions of the memory device 110 are allocated, instructions to allocate 122-1 and/or deallocate 122-2 memory, and/or instructions to manage the virtual memory system 123, among other instructions. The OS 112 can store and/or access a multidimensional matrix 116 and a number of vectors 114. In some embodiments, a vector can be a one-dimensional array.

The OS 112 can include instructions to respond to a received memory allocation request. The memory allocation request can be a request for an amount of memory that is contiguous in a plurality of dimensions of the memory, as described herein. Memory allocation requests can originate from the host 102 (e.g., from a program running on the host 102) among other originations (e.g., from a direct memory access (DMA) device). The memory allocation requests can be for virtual memory and the OS 112 can include the instructions to manage the virtual memory 123 by mapping memory addresses (e.g., virtual addresses) used by a program to physical addresses in the memory device 110 and vice versa. Additional detail regarding such instructions is provided with respect to FIGS. 4A-7C.

Figure 2:
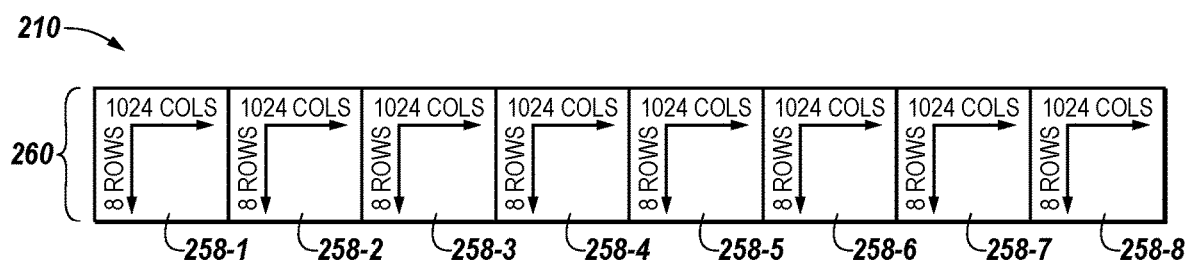
FIG. 2 is a block diagram of an apparatus in the form of a memory device in accordance with a number of embodiments of the present disclosure.

FIG. 2 is a block diagram of an apparatus in the form of a memory device 210 in accordance with a number of embodiments of the present disclosure. The memory device 210 can be analogous to the memory device 110 illustrated in FIG. 1. The memory device 210 illustrated in FIG. 2 is two-dimensional. A first dimension is the subarrays 258-1, 258-2, 258-3, 258-4, 258-5, 258-6, 258-7, . . . , 258-S. A second dimension is the rows 260. The specific example illustrated in FIG. 2 includes 8 rows 260 and 1024 columns per subarray 258, however embodiments are not limited to any particular number of rows, columns, subarrays, or dimensions. In the example of FIG. 2, an allocable portion of the memory is one row 260, which would include any column within a particular subarray 258 intersecting the row 260. Embodiments are not limited to a particular allocable portion of the memory. In some examples, a portion of a row could be allocable. The specifics of what is considered to be an allocable portion of memory can be specific to particular memory devices 210.

As described in more detail herein, a multidimensional matrix that includes a respective plurality of units per dimension can be stored, where each unit indicates whether a respective allocable portion of the memory is allocated. Each dimension of the matrix can correspond to a respective dimension of the memory. An n-dimensional matrix corresponds to an n-dimensional memory. For example with respect to FIG. 2, a matrix for the memory device 210 would include a first dimension corresponding to the subarrays 258 and a second dimension corresponding to the rows 260. To facilitate understanding of a number of embodiments of the present disclosure, more detail of an array (e.g., a subarray 258) is given with respect to FIG. 3.

Figure 3:
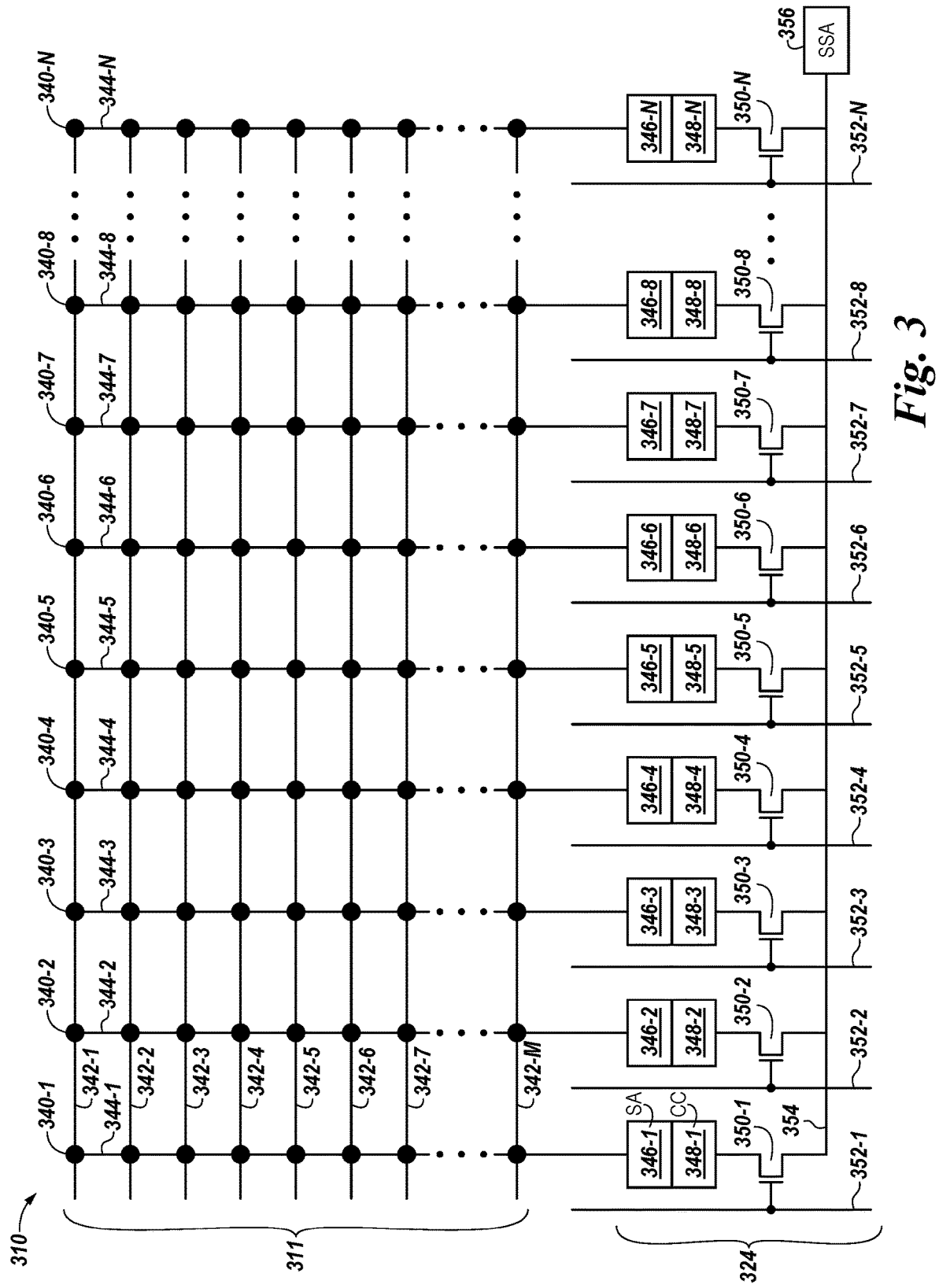
FIG. 3 is a schematic diagram of a portion of a memory device in accordance with a number of embodiments of the present disclosure.

FIG. 3 is a schematic diagram of a portion of a memory device 310 in accordance with a number of embodiments of the present disclosure. The memory device 310 can include a memory array 311 that includes memory cells 340-1, 340-2, 340-3, 340-4, 340-5, 340-6, 340-7, 340-8, . . . , 340-N coupled to rows of access lines 342-1, 342-2, 342-3, 342-4, 342-5, 342-6, 342-7, . . . , 342-M and columns of sense lines 344-1, 344-2, 344-3, 344-4, 344-5, 344-6, 344-7, 344-8, . . . , 344-N. The memory array 311 is not limited to a particular number of access lines and/or sense lines, and use of the terms "rows" and "columns" does not intend a particular physical structure and/or orientation of the access lines and/or sense lines. Although not pictured, each column of memory cells can be associated with a corresponding pair of complementary sense lines.

Each column of memory cells can be coupled to sensing circuitry 324, which can be analogous to sensing circuitry 124 illustrated in FIG. 1. In this example, the sensing circuitry includes a number of sense amplifiers 346-1, 346-2, 346-3, 346-4, 346-5, 346-6, 346-7, 346-8, . . . , 346-N coupled to the respective sense lines 344. The sense amplifiers 346 are coupled to input/output (I/O) line 354 (e.g., a local I/O line) via access devices (e.g., transistors) 350-1, 350-2, 350-3, 350-4, 350-5, 350-6, 350-7, 350-8, . . . , 350-N. In this example, the sensing circuitry also includes a number of compute components 348-1, 348-2, 348-3, 348-4, 348-5, 348-6, 348-7, 348-8, . . . , 348-N coupled to the respective sense lines 344. Column decode lines 352-1, 352-2, 352-3, 352-4, 352-5, 352-6, 352-7, 352-8, . . . , 352-N are coupled to the gates of transistors 350 respectively, and can be selectively activated to transfer data sensed by respective sense amps 346 and/or stored in respective compute components 348 to a secondary sense amplifier 356. In a number of embodiments, the compute components 348 can be formed on pitch with the memory cells of their corresponding columns and/or with the corresponding sense amplifiers 346.

In a number of embodiments, the sensing circuitry (e.g., compute components 348 and sense amplifiers 346) is configured to perform a number of logical operations on elements stored in array 311. As an example, a first plurality of elements can be stored in a first group of memory cells coupled to a particular access line (e.g., access line 342-1) and to a number of sense lines 344, and a second plurality of elements can be stored in a second group of memory cells coupled to a different access line (e.g., access line 342-2) and the respective number of sense lines 344. Each element of the first plurality of elements can have a logical operation performed thereon with a respective one of the second plurality of elements, and the result of the logical operation can be stored (e.g., as a bit-vector) in a third group of memory cells coupled to a particular access line (e.g., access line 342-3) and to the number of sense lines 344.

A number of embodiments of the present disclosure can include allocating a region of memory that is contiguous in a plurality of dimensions. In the example described above, and as illustrated in more detail with respect to FIGS. 8-9, some advantages of the present disclosure include providing an ability to perform such logical operations on multiple allocable portions of the memory without an intermediate step of moving data that is stored in memory and/or allocating a temporary allocable portion of memory, among others. Some memory devices 310 may include many (e.g., thousands) of columns 344. According to the present disclosure, a logical operation can be performed on the many memory elements associated with the many (e.g., thousands) of columns 344 in parallel in memory (e.g., without transferring the data out of the array, such as to a processing resource). Such embodiments can save a significant amount of time that would otherwise be required if the data was transferred to a processing resource to perform the logical operations (e.g., at 64 bits per clock cycle). As noted above, further advantages can be realized by allocating an amount of memory that is contiguous in multiple dimensions before the logical operation is performed so that there is no stall in the performance of the logical operation in memory in order to align data and/or allocate a temporary allocable portion of memory (e.g., allocate a temporary row of memory).

Figure 4A:
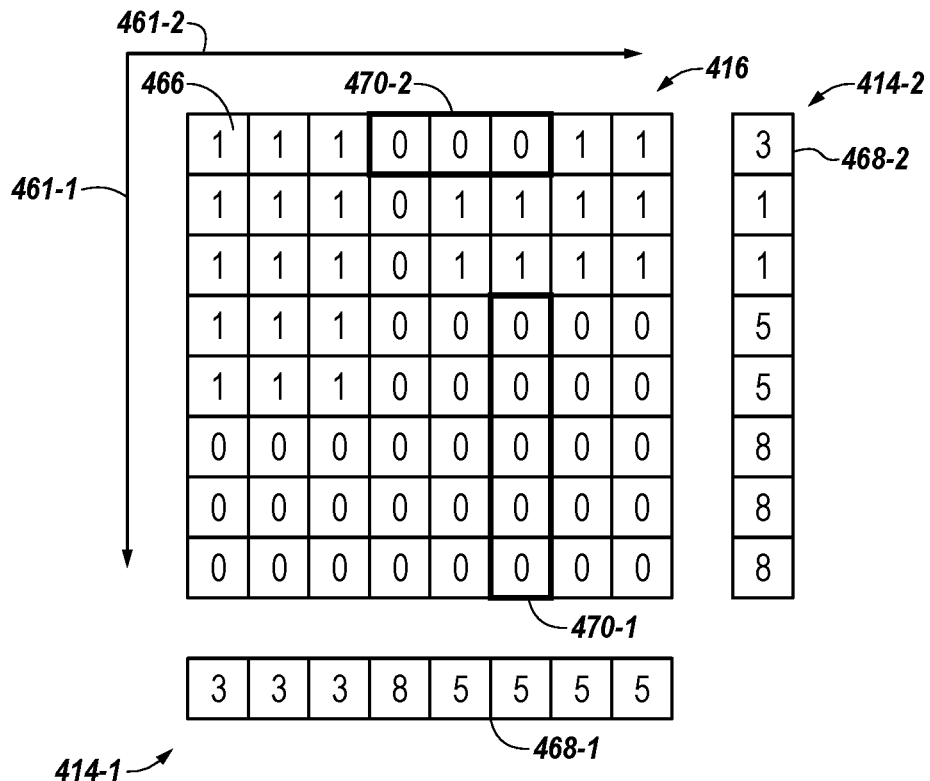
FIG. 4A is a diagram of a matrix and a number of vectors in accordance with a number of embodiments of the present disclosure.

FIG. 4A is a diagram of a matrix 416 and a number of vectors 414-1, 414-2 in accordance with a number of embodiments of the present disclosure. The matrix 416 is a multidimensional matrix that stores information indicating whether each allocable portion of the memory is allocated. The matrix 416 includes a respective plurality of units per dimension. Each unit (e.g., unit 466) of the matrix 416 indicates whether a respective allocable portion of memory is allocated. As illustrated, a unit of "1" indicates that the respective allocable portion is allocated and a unit of "0" indicates that the respective allocable portion is unallocated however embodiments are not limited to this convention. In the example of FIG. 4A, the matrix 416 includes information for a first dimension 461-1 (e.g., rows) and a second dimension 461-2 (e.g., subarrays). Each dimension 461 of the matrix 416 corresponds to a respective dimension of the memory. The matrix 416 can be an n-dimensional matrix corresponding to n-dimensions of the memory. At each intersection of the n-dimensions, the matrix 416 can include a respective indication of whether a corresponding allocable portion of the memory is allocated. Each intersection of the matrix 416 represents one allocable portion of the memory.

Each vector 414 corresponds to a respective one of the dimensions 461 (e.g., vector 414-1 corresponds to dimension 416-1 and vector 414-2 corresponds to dimension 416-2). Each vector 414 includes a respective plurality of entries 468. Each entry 468 represents a maximum number of contiguous unallocated allocable portions 470 of the memory in the corresponding dimension that correspond to a particular element of a different dimension. For example, vector 414-1 includes a plurality of entries including entry 468-1 (e.g., "5"), which represents the maximum number of contiguous unallocated allocable portions 470-1 of the memory in the corresponding first dimension 461-1 that correspond to a particular element of the second dimension 461-2. The entry 468-1 ("5") indicates that there are a maximum of 5 contiguous unallocated allocable portions (the units that are equal to "0" in the column of units above entry 468-1, which includes, in order, from top-to-bottom, units 0, 1, 1, 0, 0, 0, 0, 0, thus including a maximum of 5 consecutive zeroes). That column of units also includes a single zero by itself, but five is greater than one, which is why the entry 468-1 indicates "5". Likewise, for example, the vector 414-2 includes a plurality of entries including entry 468-2 (e.g., "3"), which represents the maximum number of contiguous unallocated allocable portions 470-2 of the memory in the corresponding second dimension 461-2 that correspond to a particular element of the first dimension 461-1. The entry 468-2 ("3") indicates that there are a maximum of 3 contiguous unallocated allocable portions (the units that are equal to "0" in the row of units to the left of entry 468-2, which includes, in order, from left-to-right, units 1, 1, 1, 0, 0, 0, 1, 1, thus including a maximum of 3 consecutive zeroes).

Figure 4B:
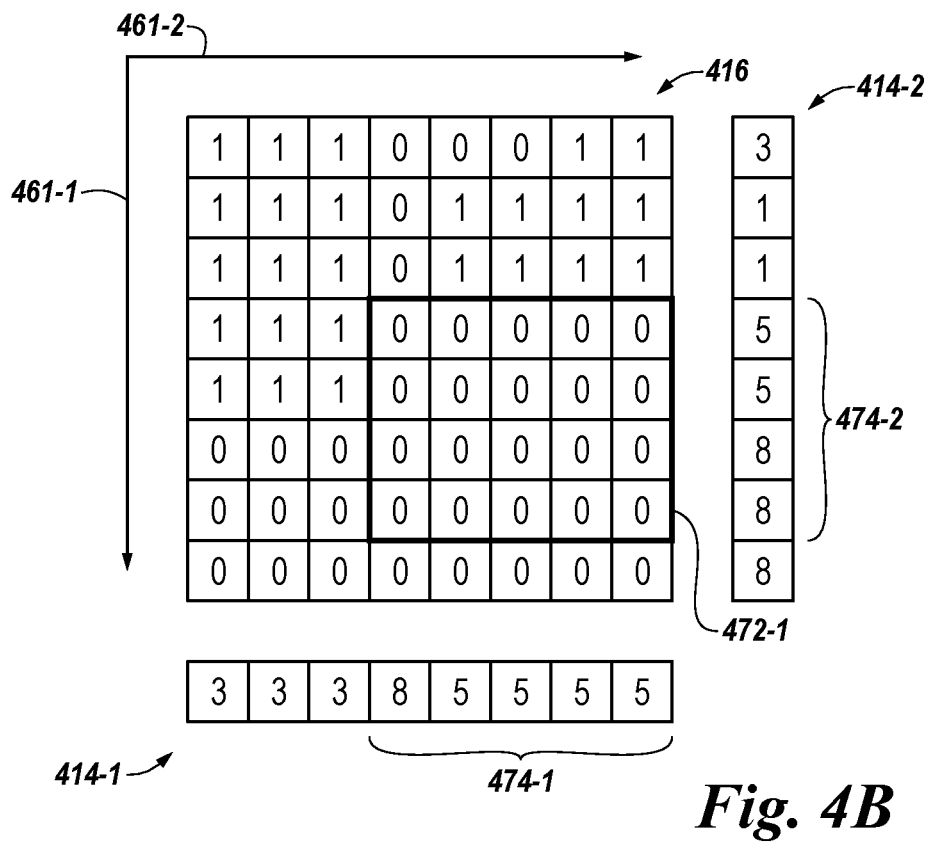
FIG. 4B is a diagram of the matrix and the number of vectors illustrated in FIG. 4A, highlighting a candidate region in accordance with a number of embodiments of the present disclosure.
Figure 4C:
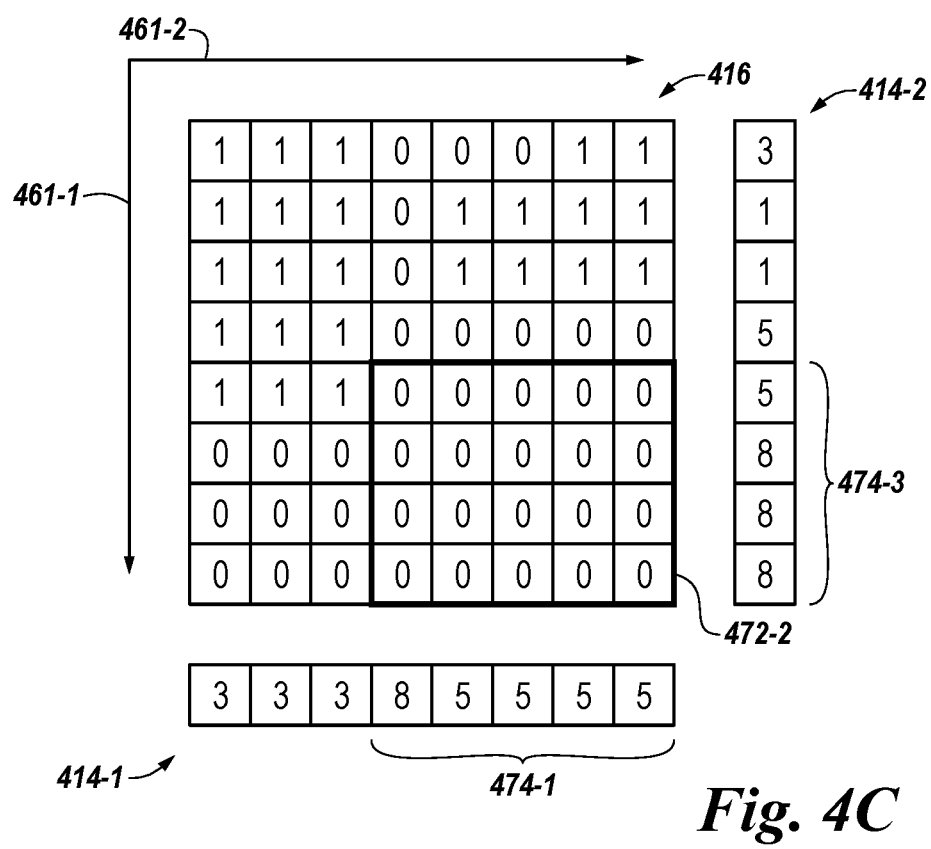
FIG. 4C is a diagram of the matrix and the number of vectors illustrated in FIG. 4A, highlighting a candidate region in accordance with a number of embodiments of the present disclosure.

An operating system of a host and/or a controller can be configured to search the vectors 414 to determine whether the memory includes a candidate region corresponding to an amount of memory that is contiguous in the plurality of dimensions 461. The amount of memory can be defined by a received memory allocation request that specifies an amount of memory that is contiguous in more than one dimension 461. The operating system of the host and/or the controller can search the vectors 414 to determine whether the maximum number of contiguous unallocated allocable portions 470 of the memory per corresponding dimension 461 is sufficient in the dimensions 461 to fulfill the memory allocation request. FIGS. 4B-4C illustrate examples of such candidate regions.

An operating system of a host (e.g., operating system 112 of host 102 illustrated in FIG. 1) and/or a controller can be configured to store and/or update the matrix 416. For example, the matrix 416 can be updated after memory is allocated. The total memory space used to represent the virtual allocations for any given n-dimensional memory is the sum of the space used to represent the matrix 416 and the vectors 414.

FIG. 4B is a diagram of the matrix 416 and the number of vectors 414-1, 414-2 illustrated in FIG. 4A, highlighting a candidate region 472-1 in accordance with a number of embodiments of the present disclosure. As described herein, a memory allocation request for an amount of memory that is contiguous in a plurality of dimensions 461 of the memory can be received. In some embodiments, the memory allocation request can be for an amount of virtual memory that also specifies dimensions of the physical memory to be allocated to fulfill the request for virtual memory. For example, a memory allocation request can be for an amount of memory comprising a region of memory that includes four contiguous allocable units in a first dimension 461-1 of the memory by five contiguous allocable units in a second dimension of the memory 461-2 (e.g., a region that measures 4×5 allocable units), which is a request for a region of memory that includes total of 20 allocable units.

An operating system of a host and/or a controller can be configured to determine whether the first dimension 461-1 includes a first number of contiguous unallocated allocable portions sufficient to fulfill the memory allocation request. For example, this can be accomplished by searching a vector 414-1 corresponding to the first dimension 461-1 for information indicating a maximum number of contiguous unallocated allocable portions of the physical memory in the first dimension 461-1. Each entry in the vector 414-1 indicates the maximum number of contiguous unallocated allocable portions of the physical memory in the first dimension 461-1. Because the memory allocation request specifies four contiguous allocable portions in the first dimension 461-1 and five contiguous allocable portions in the second dimension 461-2, the vector 414-1 can be searched for five consecutive entries that indicate at least four consecutive allocable portions are unallocated. The first three entries in the vector 414-1 are 3, 3, 3, so these will not be sufficient to fulfill the memory allocation request. However the remaining five entries are 8, 5, 5, 5, 5, which means that there are at least five consecutive entries greater than or equal to four, so the memory should have sufficient availability in the first dimension 461-1. These consecutive sufficient entries are labeled as 474-1 in FIG. 4B.

An operating system of a host and/or a controller can be configured to determine whether the second dimension 461-2 includes a second number of contiguous unallocated allocable portions sufficient to fulfill the memory allocation request. For example, this can be accomplished by searching a vector 414-2 corresponding to the second dimension 461-2 for information indicating a maximum number of contiguous unallocated allocable portions of the physical memory in the first dimension 461-2. Because the memory allocation request specifies four contiguous allocable portions in the first dimension 461-1 and five contiguous allocable portions in the second dimension 461-2, the vector 414-2 can be searched for four consecutive entries that indicate at least five consecutive allocable portions are unallocated. The first three entries in the vector 414-1 are 3, 1, 1, so these will not be sufficient to fulfill the memory allocation request. However the next four entries are 5, 5, 8, 8, which means that there are at least four consecutive entries greater than or equal to five, so the memory should have sufficient availability in the second dimension 461-2. These consecutive sufficient entries are labeled as 474-2 in FIG. 4B. Thus, it has been determined that the memory includes a region 472-1 corresponding to the requested amount that is contiguous in the dimensions 461-1, 461-2 that is a candidate as being unallocated based on information (e.g., information stored in the vectors 414-1, 414-2) indicating a maximum number of contiguous unallocated allocable portions of the memory. Although not specifically illustrated, the operating system of a host and/or a controller can be configured to search additional vectors, if such vectors exist (e.g., for a multidimensional memory that includes more than two dimensions).

Figure 7A:
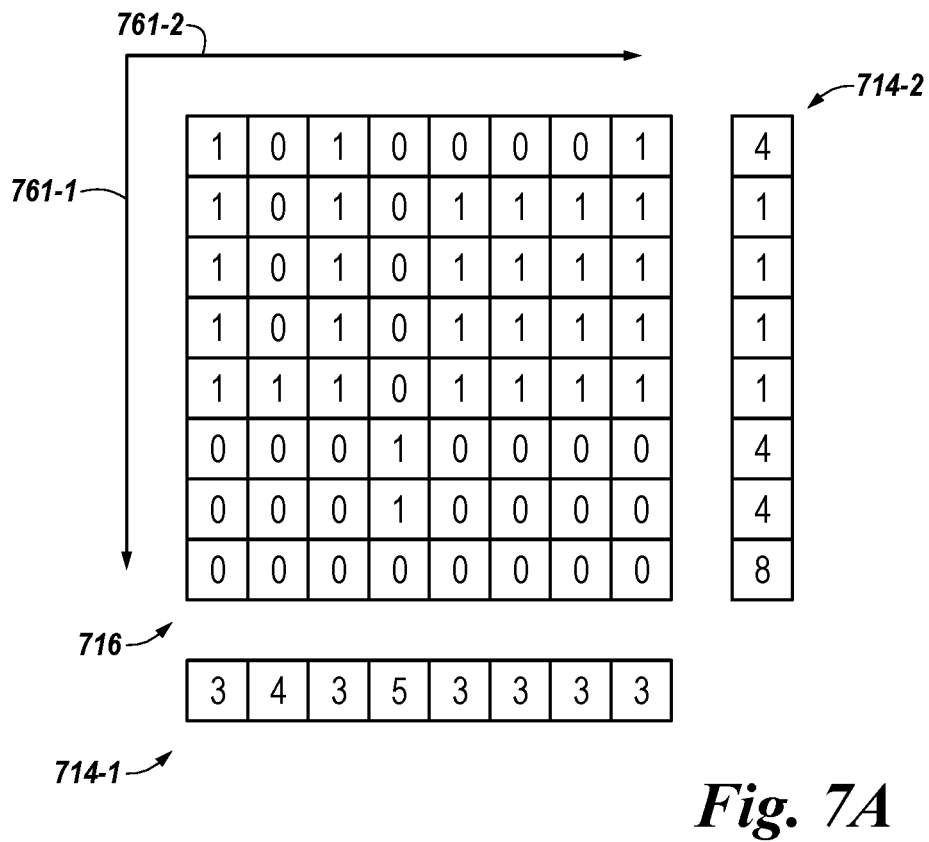
FIG. 7A is a diagram of a matrix and a number of vectors in accordance with a number of embodiments of the present disclosure.
Figure 7B:
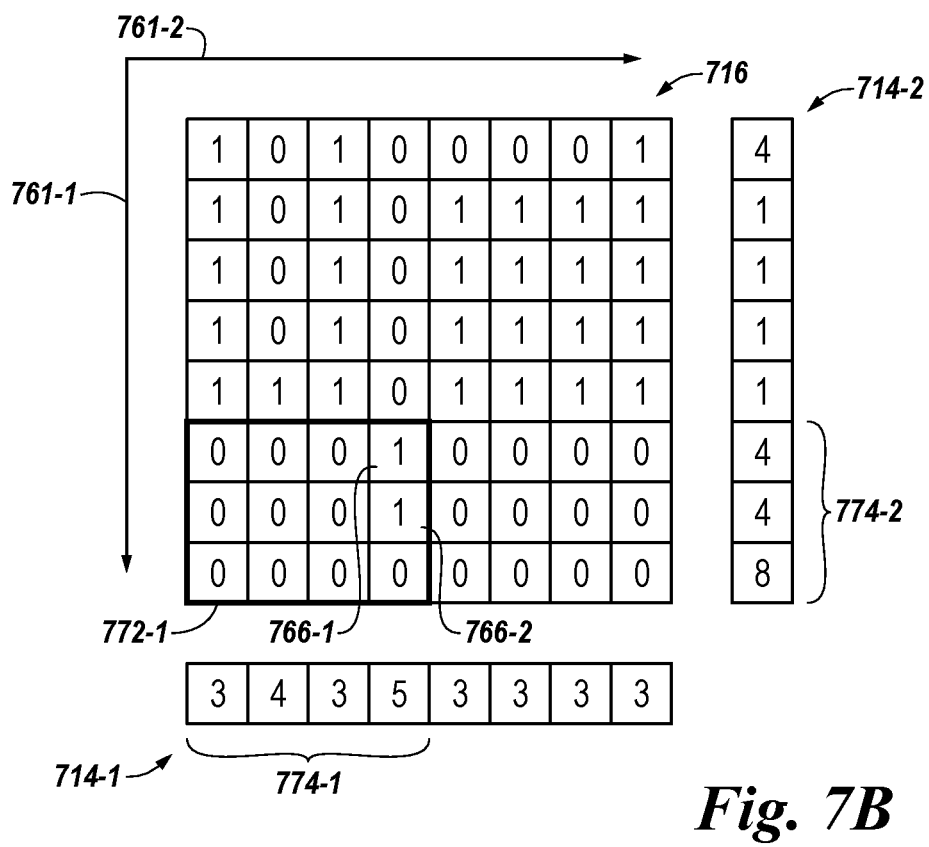
FIG. 7B is a diagram of the matrix and the number of vectors illustrated in FIG. 7A, highlighting a candidate region that is partially allocated in accordance with a number of embodiments of the present disclosure.

However, the candidate region 472-1 may be partially allocated (see the example illustrated in FIG. 7B). In response to determining that the memory includes the candidate region 472-1, the operating system of a host and/or a controller can be configured to determine whether the candidate region 472-1 is unallocated based on a subset (e.g., the portion of the matrix 416 indicated as the candidate region 472-1) of information (e.g., the matrix 416) indicating whether each allocable portion of the memory is allocated. The subset corresponds to the candidate region 472-1 only. The candidate region 472-1 is illustrated in the matrix 416 even though the matrix 416 is not the memory itself because the matrix 416 includes a plurality of units per dimension 461 that each indicate whether a respective allocable portion of memory is allocated. Thus, the candidate region 472-1 is highlighted within the matrix 416 as a representation of the corresponding region of physical memory. The portion of the matrix 416 includes a number of units equal to a number of allocable portions of the memory needed to fulfill the memory allocation request. The operating system of a host and/or a controller can be configured to scan only the portion of the matrix 416 (e.g., the candidate region 472-1) based on a result of searching the vectors 414. As described herein, the unit "0" indicates that that a corresponding allocable portion of memory is unallocated and the unit "1" indicates that a corresponding allocable portion of memory is allocated. As illustrated in FIG. 4B, the candidate region 472-1 includes all 0s, thus, scanning the portion of the matrix would result in a confirmation that the portion of the matrix included all 0's, providing a determination that the candidate region 472-1 is unallocated. Searching the vectors 414 and scanning a respective portion 472 of the matrix 416 reduces the search space for finding available multidimensional memory versus an alternative of searching a bit for every allocable portion of the memory.

FIG. 4C is a diagram of the matrix 416 and the number of vectors 414-1, 414-2 illustrated in FIG. 4A, highlighting a candidate region 472-2 in accordance with a number of embodiments of the present disclosure. Returning to the discussion of searching the vectors 414, the first vector 414-1 included only one set 474-1 of consecutive entries sufficient to fulfill the memory allocation request in the first dimension 461-1 (e.g., the entries 8, 5, 5, 5, 5, were the only set of at least five consecutive entries that indicate at least four consecutive allocable portions are unallocated in the first dimension 461-1). In FIG. 4B, the set 474-2 of consecutive entries sufficient to fulfill the memory allocation request in the second dimension 461-2 (e.g., the entries 5, 5, 8, 8, were a set of at least four consecutive entries that indicate at least five consecutive allocable portions are unallocated in the second dimension 461-2) was identified. However, as illustrated in FIG. 4C, the second vector 414-2 includes another set 474-3 of consecutive entries sufficient to fulfill the memory allocation request in the second dimension 461-2 (e.g., the entries 5, 8, 8, 8, are a set of at least five consecutive entries that indicate at least four consecutive allocable portions are unallocated in the second dimension 461-2). Thus, the operating system of a host and/or a controller can determine that the memory includes another region 472-2 corresponding to the requested amount that is contiguous in the dimensions 461-1, 461-2 that is a candidate as being unallocated based on information (e.g., information stored in the vectors 414-1, 414-2) indicating a maximum number of contiguous unallocated allocable portions of the memory.

Figure 5:
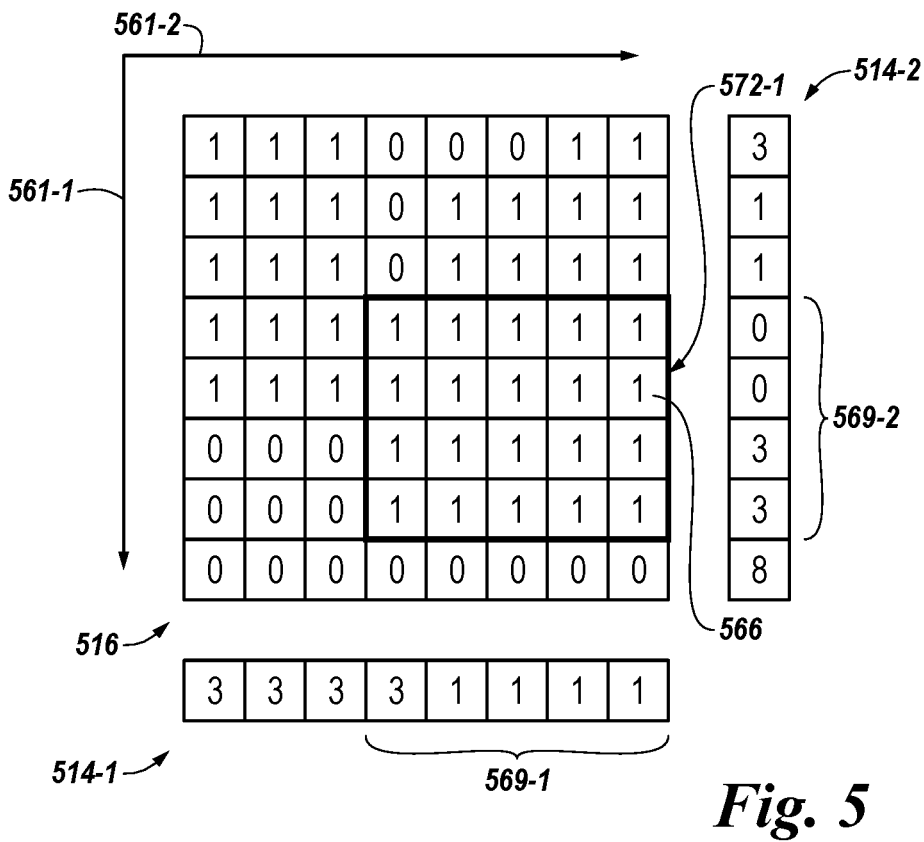
FIG. 5 is a diagram of the matrix and the number of vectors illustrated in FIG. 4A after allocation of the candidate region highlighted in FIG. 4B in accordance with a number of embodiments of the present disclosure.

FIG. 5 is a diagram of the matrix and the number of vectors illustrated in FIG. 4A after allocation of the candidate region highlighted in FIG. 4B in accordance with a number of embodiments of the present disclosure. The operating system of a host and/or a controller can be configured to allocate a candidate region 572-1, which is analogous to candidate region 472-1 illustrated in FIG. 4B, in response to determining that the candidate region 572-1 is unallocated. The allocation of the candidate region 572-1 can fulfill the memory allocation request. After allocation, the operating system of a host and/or a controller can be configured to update the multidimensional matrix 516 and the vectors 514-1, 514-2. For example, updating the matrix 516 can include changing the units within the candidate region 572-1 from 0 to 1 (e.g., as illustrated at unit 566, which has changed from a 0 in FIG. 4B to a 1 in FIG. 5).

Updating the vectors 514 can include calculating new entries for the sets (e.g., sets 474-1, 474-2 illustrated in FIG. 4B) of consecutive entries that were sufficient to fulfill the memory allocation request and that correspond to the allocated region 572-1. For example, in vector 514-1, the set of entries 569-1 have been updated from 8, 5, 5, 5, 5, in FIG. 4B to 3, 1, 1, 1, 1, in FIG. 5 because with the allocation of the region 572-1, the maximum number of consecutive unallocated allocable portions of memory have changed in the first dimension 561-1 for that region 572-1. Likewise, in vector 514-2, the set of entries 569-2 have been updated from 5, 5, 8, 8, in FIG. 4B to 0, 0, 3, 3, in FIG. 5 because with the allocation of the region 572-1, the maximum number of consecutive unallocated allocable portions of memory have changed in the second dimension 561-2 for that region 572-1.

Figure 6:
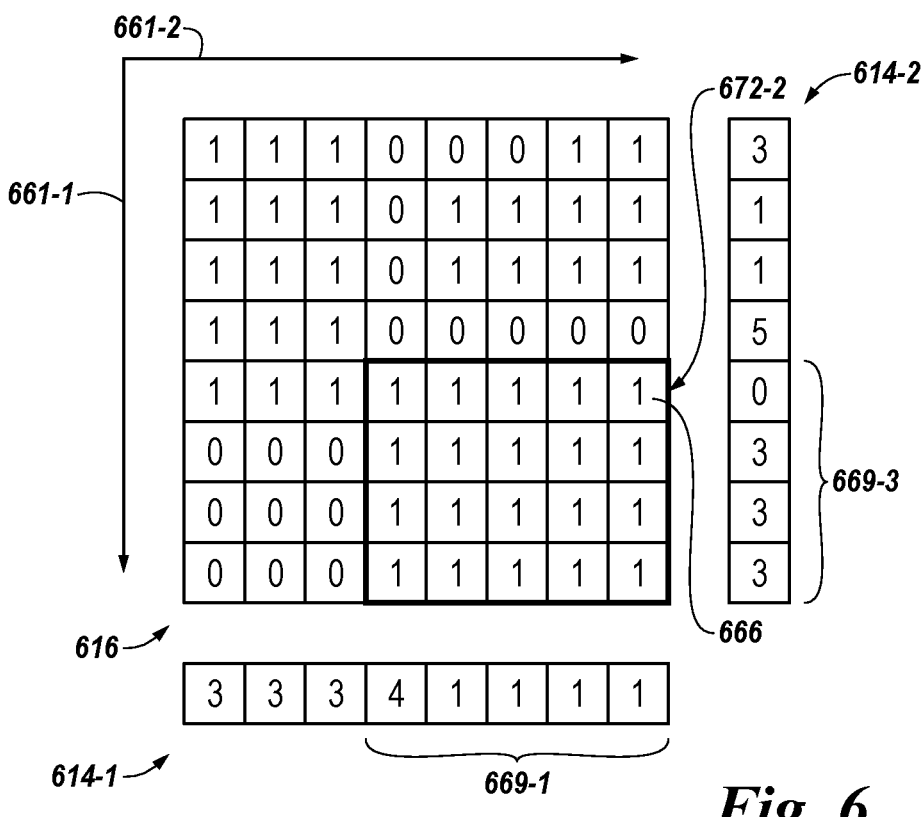
FIG. 6 is a diagram of the matrix and the number of vectors illustrated in FIG. 4A after allocation of the candidate region highlighted in FIG. 4C in accordance with a number of embodiments of the present disclosure.

FIG. 6 is a diagram of the matrix and the number of vectors illustrated in FIG. 4A after allocation of the candidate region highlighted in FIG. 4C in accordance with a number of embodiments of the present disclosure. The operating system of a host and/or a controller can be configured to allocate a candidate region 672-2, which is analogous to candidate region 472-2 illustrated in FIG. 4C, in response to determining that the candidate region 672-2 is unallocated. The allocation of the candidate region 672-2 can fulfill the memory allocation request. After allocation, the operating system of a host and/or a controller can be configured to update the multidimensional matrix 616 and the vectors 614-1, 614-2. For example, updating the matrix 616 can include changing the units within the candidate region 672-1 from 0 to 1 (e.g., as illustrated at unit 666, which has changed from a 0 in FIG. 4C to a 1 in FIG. 6).

Updating the vectors 614 can include calculating new entries for the sets (e.g., sets 474-1, 474-3 illustrated in FIG. 4C) of consecutive entries that were sufficient to fulfill the memory allocation request and that correspond to the allocated region 672-2. For example, in vector 614-1, the set of entries 669-1 have been updated from 8, 5, 5, 5, 5, in FIG. 4C to 4, 1, 1, 1, 1, in FIG. 6 because with the allocation of the region 672-2, the maximum number of consecutive unallocated allocable portions of memory have changed in the first dimension 661-1 for that region 672-2. Likewise, in vector 614-2, the set of entries 669-3 have been updated from 5, 8, 8, 8, in FIG. 4C to 0, 3, 3, 3, in FIG. 6 because with the allocation of the region 672-2, the maximum number of consecutive unallocated allocable portions of memory have changed in the second dimension 661-2 for that region 672-2.

Comparing the result of the allocation illustrated in FIG. 5 to the allocation illustrated in FIG. 6, FIG. 5 results in a larger maximum consecutive unallocated allocable portion in the second dimension 561-2. The vector 514-2 includes an 8, whereas the largest maximum consecutive unallocated allocable portion in FIG. 6 is 5, as illustrated by the vector 614-2. However, FIG. 6 results in a larger maximum consecutive unallocated allocable portion in the first dimension 661-1. The vector 614-1 includes a 4, whereas the largest maximum consecutive unallocated allocable portion in FIG. 5 is 3, as illustrated by the vector 514-1. In some embodiments, when more than one allocation is possible to satisfy a memory allocation request, the operating system of a host and/or a controller can be configured to choose between the possibilities based on which dimension of memory is more frequently allocated in larger consecutive allocable portions or based on a configurable operating parameter.

FIG. 7A is a diagram of a matrix 716 and a number of vectors 714-1, 714-2 in accordance with a number of embodiments of the present disclosure. The matrix 716 can be analogous to the matrix 416 illustrated in FIG. 4A, but with different entries. Likewise, the vectors 714 can be analogous to the vectors 414 illustrated in FIG. 4A, but with different entries. In the example of FIG. 7A, the matrix 716 includes information for a first dimension 761-1 and a second dimension 761-2. Each dimension 761 of the matrix 716 corresponds to a respective dimension of the memory.

FIG. 7B is a diagram of the matrix and the number of vectors illustrated in FIG. 7A, highlighting a candidate region 772-1 that is partially allocated in accordance with a number of embodiments of the present disclosure. The operating system of a host and/or a controller can be configured to determine whether a first region 772-1 of memory that is contiguous in more than one dimension 761-1, 761-2 and that is a candidate as being unallocated exists. The candidate region 772-1 is an amount of memory sufficient to fulfill the memory allocation request. For example, a memory allocation request can be for an amount of memory comprising a region of memory that includes three contiguous allocable units in a first dimension 761-1 of the memory by four contiguous allocable units in a second dimension of the memory 761-2 (e.g., a region that measures 3×4 allocable units), which is a request for a region of memory that includes total of 12 allocable units.

Because the memory allocation request specifies three contiguous allocable portions in the first dimension 761-1 and four contiguous allocable portions in the second dimension 761-2, the vector 714-1 can be searched for four consecutive entries that indicate at least three consecutive allocable portions are unallocated. The first four entries in the vector 714-1 are 3, 4, 3, 5, which means that there are at least four consecutive entries greater than or equal to three, so the memory should have sufficient availability in the first dimension 761-1. These consecutive sufficient entries are labeled as 774-1 in FIG. 7B.

Because the memory allocation request specifies three contiguous allocable portions in the first dimension 761-1 and four contiguous allocable portions in the second dimension 761-2, the vector 714-2 can be searched for three consecutive entries that indicate at least four consecutive allocable portions are unallocated. The first three entries in the vector 714-1 are 4, 1, 1, so these will not be sufficient to fulfill the memory allocation request. However, skipping down, the last three entries are 4, 4, 8, which means that there are at least three consecutive entries greater than or equal to four, so the memory should have sufficient availability in the second dimension 761-2. These consecutive sufficient entries are labeled as 774-2 in FIG. 7B. Thus, it has been determined that the memory includes a region 772-1 corresponding to the requested amount that is contiguous in the dimensions 761-1, 761-2 that is a candidate as being unallocated.

The operating system of a host and/or a controller can be configured to scan a subset of information indicating whether each allocable portion of the memory is unallocated in response to determining that the first candidate region 772-1 exists. The subset corresponds to the first candidate region 772-1 only. The subset of information can be the information indicated in the matrix 716 within the area highlighted as the first candidate region 772-1. This information can be used to determine whether the first number of contiguous unallocated allocable portions (e.g., the at least three contiguous allocable portions searched for in the first vector 714-1) and the second number of contiguous unallocated allocable portions (e.g., the at least four contiguous allocable portions searched for in the second vector 714-2) are aligned in the first dimension 761-1 and the second dimension 761-2 to form a region of physical memory that is contiguous in the first dimension 761-1 and the second dimension 761-2. If they are aligned in the first dimension 761-1 and the second dimension 761-2, then the region can be allocated. However, as illustrated in FIG. 7B, they are not aligned (at least three of the five consecutive 0s indicated by the entry "5" in the set of consecutive sufficient entries 774-1 are not aligned with the three consecutive 0s indicated by the entries 3, 4, 3 is the set 774-1). This lack of alignment is also indicated by the fact that candidate region 772-1, as illustrated in FIG. 7B includes some 1s, (e.g., unit 766-1 is a 1 and unit 766-2 is a 1).

This is an example of an instance where the information in the vectors 714 is insufficient on its own to provide certainty whether the candidate region 772-1 is unallocated, which is why the subset of the matrix 716 is scanned after a candidate region 772-1 is identified. The candidate region 772-1 is partially allocated and thus not unallocated. If the candidate region 772-1 had been unallocated, it could have been allocated to fulfill the memory allocation request. In response to the subset of information indicating the first candidate region 772-1 as being allocated (at least partially allocated), the operating system of a host and/or a controller can be configured to determine whether a second region of the memory that is sufficient to fulfill the memory request and that is contiguous in more than one dimension and that is a candidate as being unallocated exists. A determination can be made as to whether the memory includes a second region that is contiguous in the plurality of dimensions 761 corresponding to the requested amount that is a second candidate, as illustrated in more detail in FIG. 7C.

Figure 7C:
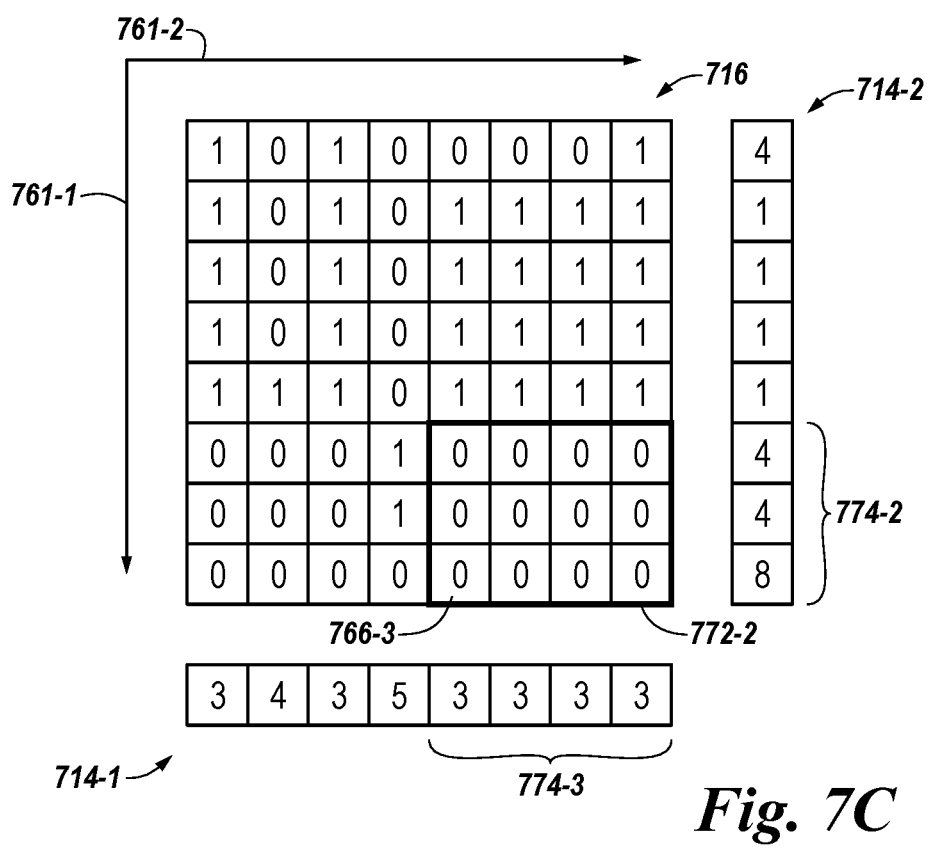
FIG. 7C is a diagram of the matrix and the number of vectors illustrated in FIG. 7A, highlighting a candidate region that is unallocated in accordance with a number of embodiments of the present disclosure.

FIG. 7C is a diagram of the matrix and the number of vectors illustrated in FIG. 7A, highlighting a candidate region 772-2 that is unallocated in accordance with a number of embodiments of the present disclosure. The operating system of a host and/or a controller can be configured to determine whether a second region 772-2 of memory that is contiguous in more than one dimension 761-1, 761-2 and that is a candidate as being unallocated exists.

As was previously described with respect to FIG. 7B, the last three entries of the second vector 714-2 are 4, 4, 8, which means that there are at least three consecutive entries greater than or equal to four, so the memory should have sufficient availability in the second dimension 761-2. These consecutive sufficient entries are labeled as 774-2 in FIG. 7B, and are the only set of entries in the second vector 714-2 sufficient to fulfill the memory allocation request in the second dimension 761-2. Therefore, the first vector 714-1 can be searched for another set of entries sufficient to fulfill the memory allocation request in response to the subset of information indicating that the first candidate region 772-1 (illustrated in FIG. 7B) is not unallocated.

The last four entries in the vector 714-1 are 3, 3, 3, 3, which means that there are at least four consecutive entries greater than or equal to three, so the memory should have sufficient availability in the first dimension 761-1. These consecutive sufficient entries are labeled as 774-3 in FIG. 7C. Other than the set 774-1 illustrated and discussed with respect to FIG. 7B, any group of four consecutive entries in the vector 714-1 would include values greater than or equal to three, so any group of four consecutive entries would indicate that the memory should have sufficient availability in the first dimension 761-1 based on searching the vector 714-1 alone. However, as was observed previously from scanning the portion 772-1 of the matrix 716 in FIG. 7B, the entries 766-1, 766-2 are 1, and these entries are in the fourth column of the matrix 716, therefore only that last four columns of the matrix are capable of actually having sufficient availability in the first dimension 761-1 given the set of entries 774-2 already being known as the only viable option in the second dimension 761-2.

The set of entries 774-2 and the set of entries 774-3 collectively define the second candidate region 772-2. The operating system of a host and/or a controller can be configured to scan a different subset of the information (different than the subset described with respect to FIG. 7B) indicating whether each allocable portion of the memory is unallocated in response to determining that the second candidate region 772-2 exists. The different subset of information corresponds to the second candidate region 772-2 only. The second candidate region 772-2 can be allocated in response to the different subset of the information indicating the second candidate region as being unallocated. In the example illustrated in FIG. 7C, the subset of information corresponding to the second candidate region 772-2 does indicate that it is unallocated because all of the units therein are 0, thus the second candidate region 772-2 can be allocated to fulfill the memory allocation request. The different subset of information corresponding to the second candidate region 772-2 can be updated to indicate that the second candidate region is allocated (e.g., the 0s can be changed to 1s in the matrix 716). Likewise, the vectors 714-1, 714-2 can be updated (e.g., as described with respect to FIGS. 5-6).

If the different subset of information corresponding to the second candidate region 772-2 had not indicated that it was unallocated, then the operating system of a host and/or a controller can be configured to determine whether a third region of the memory that is contiguous in more than one dimension 761 and that is a candidate as being unallocated exists in response thereto. The vectors 714 can be searched and respective portions of the matrix 716 can be scanned, as described herein, for each iteration of this process. This process can be repeated until all possibilities have been eliminated or until the memory allocation request has been fulfilled. If a region that is contiguous in the plurality of dimension 761 of the memory and that is unallocated is not converged on (e.g., if all possibilities are eliminated without fulfilling the memory allocation request) a null point can be returned in response. The null point can indicate to the operating system, for example, that there is not sufficient memory available to fulfill the memory allocation request.

Figure 8:
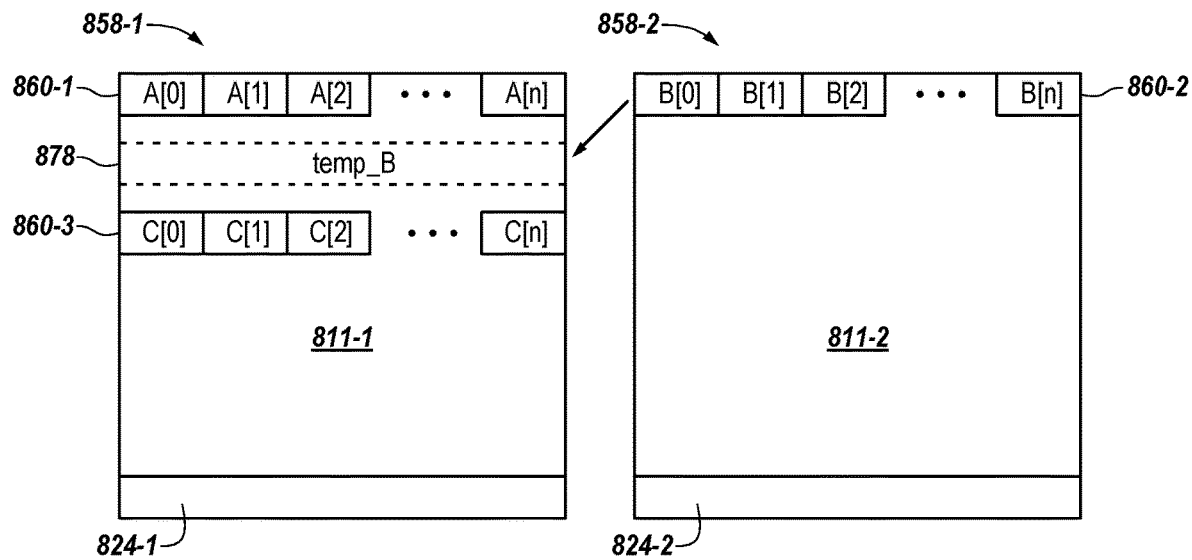
FIG. 8 is a block diagram illustrating a memory operation for memory that is not contiguous in a plurality of dimensions.

FIG. 8 is a block diagram illustrating a memory operation for memory that is not contiguous in a plurality of dimensions. The instance illustrated in FIG. 8 includes a first array portion 811-1 and a second array portion 811-2. Each array portion 811 includes a respective sensing circuitry portion 824-1, 824-2. The memory, including the array portion 811 and the sensing circuitry portion 824 can be analogous to the memory device 410 illustrated in FIG. 3. The first array portion 811-1 can be a first subarray 858-1 and the second array portion 811-2 can be a second subarray 858-2. The subarrays 858 can be a first dimension of the memory. Three rows 860-1, 860-2, 860-3 are illustrated. The first row 860-1 and the third row 860-3 are in the first subarray 858-1 and the second row 860-2 is in the second subarray 858-2. The rows 860 can be a second dimension of the memory.

A, B, and C can be considered as variables that each include a number of elements (e.g., bits) from 0 to n. Variable A in row 860-1, variable B in row 860-2, and variable C in row 860-3 are bit contiguous in one dimension (e.g., along each row) because the elements are arranged in order and are all contained in the same dimension (e.g., row). Variables A and C are also contiguous in a second dimension (e.g., column) because corresponding elements of each variable are located in the same column. For example A[0] is in the same column as C[0], A[1] is in the same column as C[1], etc. This second dimension of contiguity may also be referred to as locality. However, variable B is not contiguous in a plurality of dimensions with variables A and C because the corresponding elements are not located in the same columns. It can be said that variables A, B, and C are bit contiguous in one dimension, but not bit local.

As an example of a logical operation that can be performed in memory in order to illustrate some advantages of the present disclosure, consider an operation that uses the first row 860-1 and the second row 860-2 as input and stores a result of the logical operation performed on the first row 860-1 and the second row 860-2 in the third row 860-3. By way of example, each $i^{th}$ element of the first row 860-1 and the second row 860-2 can be added. An example of code for this operation is:

```
int i;
uint64_t A[N];
uint64_t B[N];
uint64_t C[N];
for ( i=0; i<N; i++ ){
    C[i] = A[i] + B[i];
}
``` where A is the first row 860-1, B is the second row 860-2, C is the third row 860-3, and each row 860 contains elements from 0 to N, individually referred to as i.

In order to perform the logical operation in memory, each $i^{th}$ element should be physically aligned in memory. If they are not aligned, then the software runtime allocates a temporary row 878 and preemptively moves the data (e.g., the second row 860-2 from array portion 811-2 to array portion 811-1) in order to perform the alignment prior to performing the logical operation. Thus, the additional operations of creating a temporary row and moving the data (reading and writing) must be performed. This adds latency to the logical operation that is dependent on the amount of data to be moved and the bandwidth of the respective subarrays 858.

Figure 9:
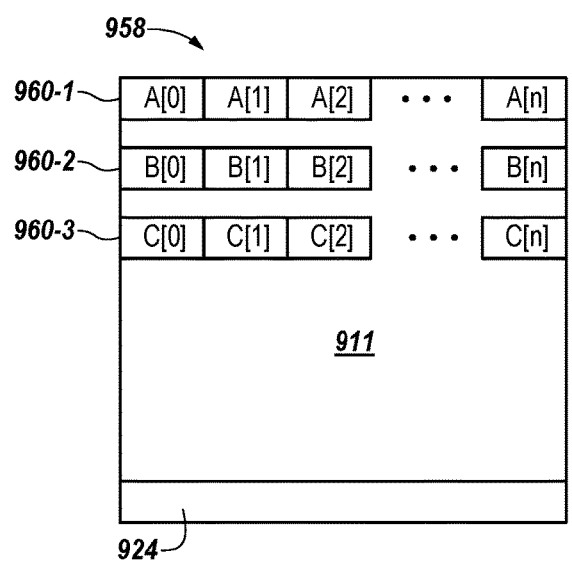
FIG. 9 is a block diagram illustrating a memory operation for memory that is contiguous in a plurality of dimensions in accordance with a number of embodiments of the present disclosure.

FIG. 9 is a block diagram illustrating a memory operation for memory that is contiguous in a plurality of dimensions in accordance with a number of embodiments of the present disclosure. Following on the example illustrated in FIG. 8, according to the present disclosure, this latency can be avoided. The ability to allocate contiguous memory in more than one dimension, as described herein, can provide a layout as illustrated in FIG. 9 in the first instance. The first row 960-1, the second row 960-2, and the third row 960-3 can all be allocated in one subarray 958 that includes array portion 911 and sensing circuitry portion 924. As such, no data movement or temporary row allocation operations are required to perform the desired logical operation in memory. This allows the performance gains provided by processing in memory (e.g., massively parallel logical operations without transferring data out of the array as described herein) to be realized without the additional latency described above.

Although not specifically illustrated as such, a non-transitory computing system readable medium for storing executable instructions can include all forms of volatile and non-volatile memory, including, by way of example, semiconductor memory devices, DRAM, HMC, EPROM, EEPROM, flash memory devices, magnetic disks such as fixed, floppy, and removable disks, other magnetic media including tape, optical media such as compact discs (CDs), digital versatile discs (DVDs), and Blu-Ray discs (BD). The instructions may be supplemented by, or incorporated in, ASICs.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
receiving an allocation request for an amount of virtual memory that is contiguous by a first number of allocable units in a first dimension and by a second number of allocable units in a second dimension;
determining whether physical memory includes a region that is contiguous by the first number of allocable units in the first dimension and by the second number of allocable units in the second dimension corresponding to the requested amount that is a candidate as being unallocated based on information indicating a maximum number of contiguous unallocated allocable portions of the memory;
in response to determining that the memory includes the candidate region, determining whether the candidate region is unallocated based on a scan of a subset of the information indicating whether each allocable portion of the memory is allocated, wherein the subset of the information corresponds to the candidate region only;
receiving data corresponding to the allocation request; and
storing the data in the candidate region.

2. The method of claim 1, wherein the method includes allocating the candidate region in response to determining that the candidate region is unallocated.

3. The method of claim 1, wherein the method is performed by at least one of a controller and an operating system of a computing system, and wherein the memory comprises random access memory.

4. The method of claim 3, wherein the random access memory comprises volatile memory or non-volatile memory.

5. An apparatus, comprising:
a host; and
a multidimensional random access memory coupled to the host, wherein the host is configured to:
receive an allocation request for an amount of virtual memory that is contiguous by a first number of allocable units in a first dimension and by a second number of allocable units in a second dimension;
determine whether physical memory includes a region that is contiguous by the first number of allocable units in the first dimension and by the second number of allocable units in the second dimension corresponding to the requested amount that is a candidate as being unallocated based on information stored in a plurality of vectors; and
in response to a determination that the memory includes the candidate region, determining whether the candidate region is unallocated.

6. The apparatus of claim 5, wherein the host is further configured to receive data corresponding to the allocation request; and
store the data in the candidate region.

7. The apparatus of claim 5, wherein the host is configured to search the plurality of vectors to determine whether the memory includes the candidate region, and
wherein each of the plurality of vectors corresponds to one of the plurality of dimensions of the memory and includes a plurality of entries.

8. The apparatus of claim 7, wherein the host is configured to search the plurality of vectors to determine whether a maximum number of contiguous unallocated allocable portions of the memory per corresponding dimension are sufficient in the plurality of dimensions to fulfill the request.

9. The apparatus of claim 5, wherein the host is configured to determine whether the region is unallocated based on information stored in a portion of a matrix, wherein the portion corresponds to the region.

10. The apparatus of claim 9, wherein the host is configured to scan only the portion of the matrix,
wherein the matrix comprises an n-dimensional matrix corresponding to n-dimensions of the memory, and
wherein the matrix, at each intersection of the n-dimensions, includes a respective indication of whether a corresponding allocable portion of the memory is allocated.

11. The apparatus of claim 5, wherein the host is configured to allocate the candidate region in response to determining that the candidate region is unallocated.

12. The apparatus of claim 5, wherein the host comprises a memory management unit.

13. The apparatus of claim 5, wherein the multidimensional random access memory comprises volatile memory or non-volatile memory.

14. An apparatus comprising:
a multidimensional random access memory; and
a host configured with an operating system coupled to the memory, wherein the operating system is configured to:
determine whether a first region of the memory that is contiguous by a first number of allocable units in a first dimension and by a second number of allocable units in a second dimension and that is a candidate as being unallocated exists, wherein the first candidate region is sufficient to fulfill a virtual memory allocation request that specifies the first number of allocable units in the first dimension and the second number of allocable units in the second dimension;
scan a subset of information indicating whether each allocable portion of the memory is unallocated in response to determining that the first candidate region exists, wherein the subset of the information corresponds to the first candidate region only;
allocate the first candidate region in response to the subset of the information indicating the first candidate region as being unallocated and update the subset of the information to indicate that the first candidate region is allocated; and
determine whether a second region of the memory that is contiguous by the first number of allocable units in the first dimension and by the second number of allocable units in the second dimension and that is a candidate as being unallocated exists in response to the subset of the information indicating the first candidate region as being allocated, wherein the second candidate region is sufficient to fulfill the memory allocation request.

15. The apparatus of claim 14, wherein the operating system is configured to:
scan a different subset of the information indicating whether each allocable portion of the memory is unallocated in response to determining that the second candidate region exists, wherein the different subset of the information corresponds to the second candidate region only; and
allocate the second candidate region in response to the different subset of the information indicating the second candidate region as being unallocated and update the different subset of the information to indicate that the second candidate region is allocated.

16. The apparatus of claim 15, wherein the operating system is configured to:
determine whether a third region of the memory that is contiguous in the plurality of dimensions and that is a candidate as being unallocated exists in response to the different subset of the information indicating the second candidate region as being allocated, wherein the third candidate region is sufficient to fulfill the memory allocation request; and
return a null point in response to determining that the third candidate region does not exist.

17. The apparatus of claim 14, wherein the multidimensional random access memory comprises volatile memory.

18. The apparatus of claim 14, wherein the multidimensional random access memory comprises non-volatile memory.

* * * * *